(12) United States Patent
Suda et al.

(10) Patent No.: US 7,280,833 B2
(45) Date of Patent: Oct. 9, 2007

(54) MOBILE COMMUNICATION TERMINAL, SERVER, COMMUNICATION SYSTEM, COMMUNICATION CONTROL METHOD, AND COMMUNICATION CONTROL PROGRAM

(75) Inventors: Hirohito Suda, Yokosuka (JP); Shinzo Ohkubo, Yokosuka (JP); Tatsuro Masamura, Tokyo (JP); Toshiaki Tanaka, Yokosuka (JP); Mitsuru Murata, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/731,147

(22) Filed: Dec. 10, 2003

(65) Prior Publication Data

US 2004/0171373 A1    Sep. 2, 2004

(30) Foreign Application Priority Data

Dec. 10, 2002  (JP)  ............................ P2002-358612
Aug. 8, 2003   (JP)  ............................ P2003-206853

(51) Int. Cl.
*H04Q 7/20*    (2006.01)
(52) U.S. Cl. .................. 455/445; 455/414.1; 455/456.1
(58) Field of Classification Search ................ 455/410, 455/414.1, 426.1, 406, 435.2, 461, 452.2, 455/445, 557, 457, 556.2, 466, 458, 550.1, 455/456.1, 417, 552.1, 415, 420; 379/91.03, 379/144, 357, 913; 370/328, 338, 341
See application file for complete search history.

(56) References Cited

U.S. PATENT DOCUMENTS 5,541,976 A    7/1996  Ghisler
5,790,946 A    8/1998  Rotzoll
6,246,882 B1   6/2001  Lachance
6,285,868 B1   9/2001  Ladue
6,418,326 B1*  7/2002  Heinonen et al. ........... 455/558
6,705,916 B2*  3/2004  Roberts et al. ............. 455/445
2003/0095032 A1* 5/2003 Hoshino et al. ........... 340/5.92
2005/0113066 A1* 5/2005 Hamberg .................... 455/411

FOREIGN PATENT DOCUMENTS

EP        0 951 193 A2   10/1999

(Continued)

OTHER PUBLICATIONS

E. S. Hall, et al., IEEE, ISBN 0-7803-7533-X, XP-010610952, pp. 640-645, "RF Rendez-Blue: Reducing Power and Inquiry Costs in Bluetooth-Enabled Mobile Systems", Oct. 14, 2002.

*Primary Examiner*—Jean Gelin
(74) *Attorney, Agent, or Firm*—Oblon, Spivak, McClelland, Maier & Neustadt, P.C.

(57) ABSTRACT

An object of the present invention is to enable appropriate switching among a plurality of modes including a cellular communication mode and an RFID information receiving function. A communication system is comprised of an RFID configured to transmit predetermined ID information of its own, a server capable of being connected to a cellular communication network, and an aggregation point for aggregating information from the RFID. In the communication system, the aggregation point, which is comprised of a mobile communication terminal or the like, is provided with an ID receiver for receiving ID information from an RFID, and a cellular communication part for performing cellular communication via the cellular communication network. Furthermore, the aggregation point is provided with a new mode controller for receiving a switching signal for switching among a plurality of modes including the cellular communication mode and the RFID information receiving function from the server, and for performing a mode switching control based on the received switching signal.

19 Claims, 29 Drawing Sheets

FOREIGN PATENT DOCUMENTS

| | | |
|---|---|---|
| EP | 1 239 634 | 9/2002 |
| EP | 1 244 043 | 9/2002 |
| JP | 2001-328713 | 11/2001 |
| KR | 1020010084253 A | 9/2001 |
| WO | WO 02/11074 | 2/2002 |

* cited by examiner

Fig.4

| ID NO. | AGGREGATION POINT NO. | LOCATION CODE | UPDATE TIME | OWNER NO. | RECEPTION INTENSITY (dB) |
|---|---|---|---|---|---|
| 12345 | 0002 | 33331 | 2002/10/11-23:11 | 77734 | 50 |
| 12346 | 0002 | 00000 | 2002/10/11-23:11 | 77734 | 60 |
| 12347 | 0003 | 33332 | 2002/10/11-23:10 | 77734 | 20 |
| 12347 | 0004 | 50001 | 2002/10/11-23:11 | 77734 | 90 |
| 12348 | 0004 | 50001 | 2002/10/11-23:20 | 77735 | 90 |
| 12348 | 0010 | 00000 | 2002/10/11-23:20 | 77735 | 10 |
| 12349 | 0012 | 50010 | 2002/10/11-23:15 | 77735 | 75 |
| 12350 | 0015 | 55540 | 2002/10/11-23:16 | 77735 | 55 |
| ... | | | | | |

41

MOBILE COMMUNICATION TERMINAL, SERVER, COMMUNICATION SYSTEM, COMMUNICATION CONTROL METHOD, AND COMMUNICATION CONTROL PROGRAM

BACKGROUND OF THE INVENTION

1. Field of the Invention

The present invention relates to a mobile communication terminal, a server, a communication system, a communication control method, and a communication control program.

2. Related Background Art

The users of cell phones are now no fewer than seventy millions in Japan, and a great number of users tend to buy a new cell phone every few years. This trend leads to generating a lot of preowned cell phones every year, and it can be said that how such a lot of preowned cell phones should be effectively utilized is a significant issue.

On the other hand, inexpensive RFIDs (Radio Frequency Identifications), which transmit information containing their own identification number at regular intervals, are commonly known, and there are also proposals on technologies and others of using such RFIDs to track links among spread goods, delivery vehicles, and warehouses in real time, thereby enabling estimation of delivery time of goods, searching for missing goods, promotion of efficiency in shipment and storage, and logistics such as joint shipment (reference should be made to Japanese Patent Application Laid-Open No. 2001-328713).

Under the circumstances as described above, it is conceivable to provide the cell phones with an RFID information receiving function of receiving signals from RFIDs, and simply providing the cell phones with the RFID information receiving function can cause the problem as described below. Namely, if the RFID information receiving function is activated before the cell phones are handled as preowned cell phones (during a period in which each cell phone is used as a mobile terminal for cellular communication), reception transactions at intervals of predetermined time will consume a massive amount of power. On the other hand, if the function as a mobile terminal for cellular communication is activated after the cell phones are handled as preowned cell phones, it will result in increasing the traffic too much in cellular communication networks. It is also expected that some users have a demand to desire to make available both the function as a mobile terminal for cellular communication and the RFID information receiving function, even with some increase in charge.

For these reasons, it is strongly desired to develop a technology of avoiding excessive power consumption and traffic by appropriate switching among a state in which only the function as a mobile terminal for cellular communication is active (a cell-phone transmit/receive mode), a state in which only the RFID information receiving function is active (an RFID information receive mode), a state in which the both functions are active (a dual mode), and so on. From a user's point of view, there are hopes for setting charging rates as low as possible for user's payment, with restrictions on use.

The present invention has been accomplished in order to solve the above problem and an object of the invention is to provide a mobile communication terminal, a server, a communication system, a communication control method, and a communication control program enabling appropriate switching among a plurality of modes as described above.

SUMMARY OF THE INVENTION

In order to achieve the above object, a mobile communication terminal according to the present invention is a mobile communication terminal comprising: identification information receiving means for receiving identification information from at least one mini-communicator which transmits predetermined identification information of its own; cellular communication means for implementing communication with a server or another terminal via a cellular communication network; and switching control means for receiving a switching signal for switching among a plurality of modes comprising an identification information receive mode of activating only the identification information receiving means out of the identification information receiving means and the cellular communication means, and a cellular communication mode of activating only the cellular communication means, and for performing a mode switching control based on the received switching signal.

A communication system according to the present invention is a communication system comprising at least one mini-communicator configured to transmit predetermined identification information of its own; a server capable of being connected to a cellular communication network; and at least one mobile communication terminal functioning as an aggregation point for aggregating information from the mini-communicator; wherein the mobile communication terminal comprises: identification information receiving means for receiving the identification information from the mini-communicator; cellular communication means for implementing communication with the server or another terminal via the cellular communication network; and switching control means for receiving a switching signal for switching among a plurality of modes comprising an identification information receive mode of activating only the identification information receiving means out of the identification information receiving means and the cellular communication means, and a cellular communication mode of activating only the cellular communication means, and for performing a mode switching control based on the received switching signal; wherein the server comprises: switching signal transmitting means for transmitting a switching signal according to a predetermined mode switching request to the mobile communication terminal; and wherein the switching control means of the mobile communication terminal performs the mode switching control based on the switching signal received from the server.

As described above, the mobile communication terminal comprises the identification information receiving means for receiving the identification information from the mini-communicator, and the cellular communication means for implementing communication with the server or another terminal via the cellular communication network. In this mobile communication terminal the switching control means receives the switching signal for switching among the plurality of modes comprising the identification information receive mode of activating only the identification information receiving means out of the identification information receiving means and the cellular communication means, and the cellular communication mode of activating only the cellular communication means, and performs the mode switching control based on the received switching signal. The plurality of modes herein may be comprised of only the above-stated identification information receive mode and cellular communication mode, or may be comprised of a total of three modes consisting of the foregoing two modes and an additional dual mode of activating both the identification information receiving means and cellular communication means. By providing the mobile communication terminal with the switching control means for performing the switching control based on the received switching signal among the plurality of modes as described above, it becomes feasible to implement appropriate switching among the plurality of modes. If an administrator of the communication system is allowed to set and control the above modes (e.g., if the administrator of the communication system is allowed to set and control the modes through the server or after-described cellular network management apparatus), the administrator can control the modes used by the users. Therefore, it becomes possible to reduce charges on the users if required resources of the communication system can be cut down.

The user (e.g., the administrator of the communication system or the like) may directly enter the switching signal into the mobile communication terminal, or the mobile communication terminal may receive the switching signal from the server. In the mode of receiving the switching signal from the server, a potential configuration is such that the server comprises switching signal transmitting means for transmitting a switching signal according to a predetermined mode switching request to the mobile communication terminal and the switching control means performs the mode switching control based on the switching signal received from the server.

Concerning the mode switching control, the cellular network management apparatus provided in the communication system may be configured to send the mode switching signal. Namely, in the configuration of the communication system, the communication system is configured to further comprise the cellular network management apparatus having: network state monitoring means for monitoring a state of the cellular communication network; class information memorizing means for memorizing class information defined for each mobile communication terminal or for each user of the mobile communication terminal; accepting means for accepting a user request about the mode switching control; and switching signal generating means for generating a mode switching signal based on at least one of the class information acquired from the class information memorizing means, the state information of the cellular communication network acquired in monitoring by the network state monitoring means, and the user request accepted by the accepting means, and for transmitting the switching signal to the mobile communication terminal; and the switching control means of the mobile communication terminal performs the mode switching control based on the switching signal received from the cellular network management apparatus.

By performing the mode switching control based on the switching signal generated based on at least one of the class information, the state information of the cellular communication network, and the user request as described above, it becomes feasible to implement the mode switching control according to the circumstances or the user request. For example, where a user having a contract of the dual mode makes a temporary request for switching into the cellular communication mode, the cellular network management apparatus can generate the mode switching signal into the cellular communication mode according to the user request. In another case where the cellular communication network is in a heavily congested state, the cellular network management apparatus can generate the mode switching signal into the RFID information receive mode, based on the state information indicating the congestion, in order to automatically switch into the RFID information receive mode in which no cellular communication is carried out.

The communication system is preferably configured to further comprise various means for estimating the location of the mini-communicator as described below. Namely, preferably, the mobile communication terminal further comprises measuring means for measuring a reception intensity of a radio wave received from the mini-communicator; and information generating means for generating transmission information to the server, which contains the identification information of the mini-communicator received from the mini-communicator, identification information of the mobile communication terminal, and the reception intensity of the radio wave from the mini-communicator, and for making the cellular communication means transmit the generated transmission information to the server; and the server further comprises a mini-communicator location database storing location information of at least one mini-communicator; a terminal location database storing location information of at least one mobile communication terminal; and location estimating means for estimating a location of a mini-communicator corresponding to transmission information, based on transmission information from the mentioned mobile communication terminal containing identification information of a mini-communicator which a mobile communication terminal received from the mentioned mini-communicator, identification information of the mentioned mobile communication terminal, and a reception intensity of a radio wave from the mentioned mini-communicator, the pre-stored location information of the mini-communicator, and the pre-stored location information of the mobile communication terminal, and for updating the mini-communicator location database by the estimated location information.

In this case, the mobile communication terminal makes the measuring means measure the reception intensity of the radio wave received from the mini-communicator, makes the information generating means generate the transmission information to the server, containing the identification information of the mini-communicator received therefrom, the identification information of the mobile communication terminal, and the reception intensity of the radio wave from the mini-communicator, and makes the cellular communication means transmit the generated transmission information to the server. The server comprises the mini-communicator location database storing the location information of at least one mini-communicator, and the terminal location database storing the location information of at least one mobile communication terminal. The location estimating means estimates the location of the mini-communicator corresponding to the transmission information, based on the received transmission information, the pre-stored location information of the mini-communicator, and the pre-stored location information of the mobile communication terminal, and updates the mini-communicator location database by the estimated location information.

In this configuration, the server estimates the location of the mini-communicator corresponding to the transmission information, whereby the location information of the mini-communicator is managed more securely by the mini-communicator location database.

In this connection, preferably, the information generating means of the above mobile communication terminal is configured to comprise: identification number memorizing means for memorizing an identification number of a mini-communicator which the mobile communication terminal was able to receive at a past point of time; determining means for comparing identification information of a mini-communicator which the mobile communication terminal is able to receive at the present time, with the identification number of the mini-communicator memorized, thereby determining whether there is a difference; and transmission control means for making the cellular communication means transmit the transmission information to the server, in a predetermined case where it is determined at least once that there is a difference. In this configuration, the transmission information is transmitted to the server only in the predetermined case where it is determined at least once that there is a difference, because of movement of at least one mini-communicator. Therefore, the server performs the estimation of location of mini-communicator and the update of the mini-communicator location database only if at least one mini-communicator is assumed to have moved, which can eliminate fruitless location estimation processing and implement efficient execution of processing.

The component for the estimation of the location of the mini-communicator does not have to be limited to the server, but the estimation may be carried out at the mobile communication terminal. In that case, the mobile communication terminal may be configured as follows. Namely, the mobile communication terminal further comprises measuring means for measuring a reception intensity of a radio wave received from the mini-communicator; receiving means for receiving from another mobile communication terminal, other terminal information containing the identification information of the mini-communicator, the reception intensity of the radio wave from the mini-communicator, and location information of the other mobile communication terminal; and location estimation control means for estimating the location of the mini-communicator corresponding to the transmission information, based on the reception intensity of the radio wave from the mini-communicator, measured by the measuring means of the mobile communication terminal, and on the other terminal information, and for notifying the server of the estimated location information.

In this case, at the mobile communication terminal, the measuring means measures the reception intensity of the radio wave received from the mini-communicator, and the receiving means receives the other terminal information containing the identification information of the mini-communicator from the other mobile communication terminal, the reception intensity of the radio wave from the mini-communicator, and the location information of the other mobile communication terminal. Then the location estimation control means estimates the location of the mini-communicator corresponding to the transmission information, based on the reception intensity of the radio wave from the mini-communicator measured by its mobile communication terminal, and on the other terminal information, and notifies the server of the estimated location information. In this manner the mobile communication terminal is able to estimate the location of the mini-communicator. Since the server is notified of the location information obtained there, the server is able to manage the location information of the mini-communicator in much the same manner as above.

Meanwhile, the mobile communication terminal is preferably configured to further comprise traffic acquiring means for acquiring traffic information in the cellular communication network; and information storing means for receiving and temporarily storing the transmission information from the information generating means, and for performing such an operation control as to output the transmission information to the cellular communication means or store the transmission information, based on the traffic information in the cellular communication network acquired by the traffic acquiring means. In this case, the traffic acquiring means acquires the traffic information in the cellular communication network, and the information storing means performs such an operation control as to output the transmission information to the cellular communication means or store the transmission information, based on the traffic information in the cellular communication network. For example, where the traffic in the cellular communication network exceeds a predetermined reference value, the information storing means can perform such an operation control as to avoid output of the transmission information to the cellular communication network. For this reason, the communication traffic can be smoothed in the cellular communication network.

Furthermore, the mobile communication terminal is preferably configured to further comprise a memory for receiving and temporarily storing the transmission information from the information generating means; and selecting-outputting means for selecting transmission information to be outputted, from the transmission information stored in the memory, based on condition information containing at least a thinning condition for transmission information or a selection condition for transmission information to be outputted or to avoid output, and for outputting the transmission information to be outputted, to the cellular communication means. In this case, the selecting-outputting means selects the transmission information to be outputted, from the transmission information stored in the memory, based on the condition information containing at least the thinning condition for transmission information or the selection condition for transmission information to be outputted or to avoid output, and outputs the transmission information to be outputted, to the cellular communication means. Therefore, the transmission information to be outputted can be appropriately selected according to the thinning condition or the selection condition for transmission information, and then be outputted. This function allows the system, for example, to avoid transmission of unnecessary transmission information indicating a halfway state in the memory, so as to decrease the transmission processing load and thus decrease the network traffic. It is also feasible to execute the transmission control and transmission avoidance control according to the desired selection condition.

In the above communication system, preferably, the server further comprises: reference time generating-outputting means for generating a reference time as a reference of time stamp and transmitting the reference time to the mobile communication terminal, and the mobile communication terminal further comprises: time measuring means for measuring time; and calculating means for calculating a difference between the reference time transmitted from the server, and a measured time, and for outputting the value of calculated difference as a time stamp.

In the above communication system, preferably, at least one of the mobile communication terminal and the server further comprises authentication means for authenticating whether a mini-communicator is a qualified one.

The mobile communication terminal forming the communication system as described above can be configured as follows.

Namely, preferably, the mobile communication terminal according to the present invention is configured to further comprise relaying means for amplifying a transmitted or received radio wave of the cellular communication network communicable with the mobile communication terminal, to relay the radio wave.

The mobile communication terminal according to the present invention is preferably configured so that the cellular communication means is configured to: set a transmission/reception channel for transmission/reception of the transmission information, separately from a user channel for transmission/reception of user data and a control channel for transmission/reception of a control signal, in communication via the cellular communication network, and transmit the transmission information through the use of the transmission/reception channel.

The server forming the communication system as described above can be configured as follows.

A server according to the present invention is a server capable of communication with at least one mobile communication terminal having identification information receiving means for receiving identification information from at least one mini-communicator, and cellular communication means for implementing communication with a server or another terminal via a cellular communication network, the server comprising: switching signal transmitting means for transmitting to the mobile communication terminal a switching signal according to a predetermined mode switching request, in order to implement switching among a plurality of modes comprising an identification information receive mode of activating only the identification information receiving means out of the identification information receiving means and the cellular communication means, and a cellular communication mode of activating only the cellular communication means, at the mobile communication terminal.

The server according to the present invention is configured to further comprise a mini-communicator location database storing location information of at least one mini-communicator; and location management means for receiving location information of a mini-communicator estimated and notified of by a mobile communication terminal, and for updating the mini-communicator location database by the received location information.

Incidentally, the present invention can also be taken as invention associated with a communication control method and be described as follows.

Namely, a communication control method according to the present invention is a communication control method in a communication system comprising at least one mini-communicator configured to transmit predetermined identification information of its own, a server capable of being connected to a cellular communication network, and at least one mobile communication terminal functioning as an aggregation point for aggregating information from the mini-communicator, the communication control method comprising: a switching signal receiving step of receiving a switching signal for switching among a plurality of modes comprising an identification information receive mode of activating only identification information receiving means out of the identification information receiving means for receiving the identification information from the mini-communicator, and cellular communication means for implementing communication with the server or another terminal via the cellular communication network, and a cellular communication mode of activating only the cellular communication means, at the mobile communication terminal; and a switching control step of performing a mode switching control based on the received switching signal.

The communication control method according to the present invention is characterized by further comprising a measuring step of measuring a reception intensity of a radio wave received from the mini-communicator, at the mobile communication terminal; an information generating step of generating transmission information to the server, which contains the identification information of the mini-communicator received from the mini-communicator, identification information of the mobile communication terminal, and the reception intensity of the radio wave from the mini-communicator, at the mobile communication terminal; an information transmitting step of transmitting the generated transmission information to the server, at the mobile communication terminal; and a location estimating step of estimating a location of a mini-communicator corresponding to the transmission information, based on the received transmission information, pre-stored location information of the mini-communicator, and pre-stored location information of the mobile communication terminal, at the server.

The communication control method according to the present invention is also characterized in that the information generating step is configured to: compare an identification number of a mini-communicator which the mobile communication terminal was able to receive at a past point of time, with identification information of a mini-communicator which the mobile communication terminal is able to receive at the present time, to determine whether there is a difference; and generate the transmission information, in a predetermined case where it is determined at least once that there is a difference.

The communication control method according to the present invention is also characterized by further comprising a measuring step of measuring a reception intensity of a radio wave received from the mini-communicator, at the mobile communication terminal; a receiving step of receiving from another mobile communication terminal, other terminal information containing identification information of a mini-communicator, a reception intensity of a radio wave from the mentioned mini-communicator, and location information of the other mobile communication terminal, at the mobile communication terminal; and a location estimating step of estimating a location of the mini-communicator corresponding to transmission information, based on the reception intensity of the radio wave from the mini-communicator, which was measured at the mobile communication terminal, and on the other terminal information, at the mobile communication terminal.

The present invention can also be taken as invention associated with a communication control program and be described as follows.

Namely, a communication control program according to the present invention is a communication control program to be executed by a computer in a mobile communication terminal comprising identification information receiving means for receiving identification information from at least one mini-communicator configured to transmit predetermined identification information of its own, and cellular communication means for implementing communication with a server or another terminal via a cellular communication network, the communication control program comprising: a switching signal receiving step of receiving a switching signal for switching among a plurality of modes comprising an identification information receive mode of activating only the identification information receiving means out of the identification information receiving means and the cellular communication means, and a cellular communication mode of activating only the cellular communication means; and a switching control step of performing a mode switching control based on the received switching signal.

The communication control program according to the present invention may further comprise a measuring step of measuring a reception intensity of a radio wave received from a mini-communicator; a determining step of comparing an identification number of a mini-communicator that the mobile communication terminal was able to receive at a past point of time, with identification information of a mini-communicator that the mobile communication terminal is able to receive at the present time, and determining whether there is a difference; and an information generating step of generating transmission information, in a predetermined case where it is determined at least once that there is a difference.

BRIEF DESCRIPTION OF THE DRAWINGS

FIG. 4 is a table showing an example of an RFID location database.

DESCRIPTION OF THE PREFERRED EMBODIMENTS

A variety of embodiments according to the present invention will be described below in order.

First Embodiment

[Configuration of Communication System]

Figure 1:
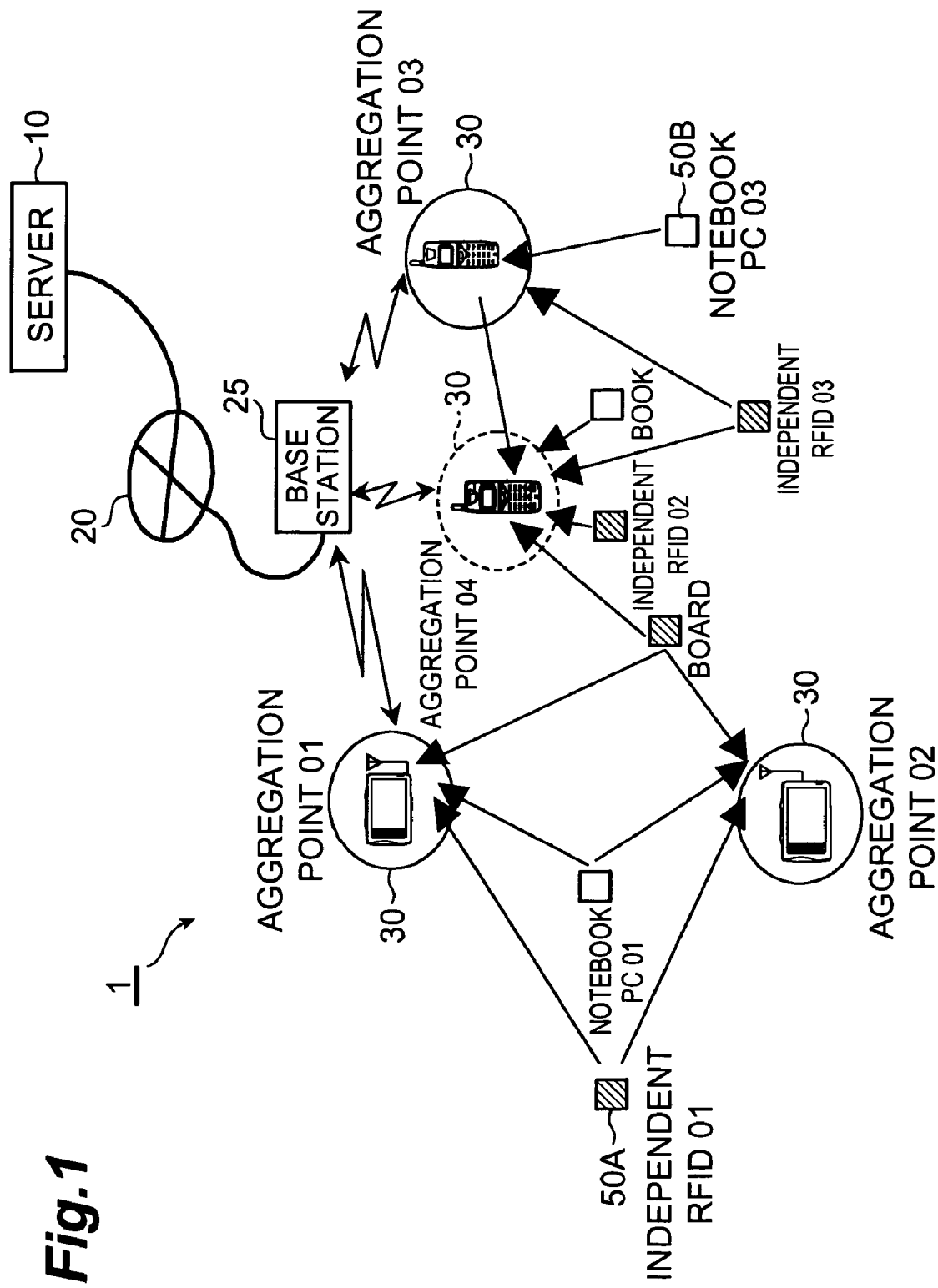
FIG. 1 is a schematic configuration diagram of a communication system in the first embodiment.

FIG. 1 shows a schematic configuration diagram of communication system 1 in the first embodiment. As shown in the same figure, communication system 1 is comprised of a plurality of mini-communicators (hereinafter referred to as "RFIDs") 50 (a generic name of 50A and 50B in FIG. 1) which are configured to transmit predetermined identification information (ID) of their own, server 10 capable of being connected to cellular communication network 20, and a plurality of aggregation points 30 for aggregating information from the RFIDs.

Each RFID 50 is located on a surface or inside of a variety of objects (including not only potable objects, but also fixed objects) such as books, boards, notebook PCs, etc., or independently located at a predetermined outdoor or indoor site. In FIG. 1, each RFID located independently is referred to as "an independent RFID." The RFIDs are classified under two types, depending upon whether or not the location information of RFID is known. RFIDs with known location information are indicated by hatched squares in FIG. 1 and, for example, include independent RFIDs 01-03, RFIDs placed on boards, and so on. On the other hand, RFIDs with unknown location information are indicated by non-hatched squares in FIG. 1 and, for example, include notebook PCs 01 and 02, RFIDs placed on books, and so on. Similarly, aggregation points 30 are also classified into aggregation points with known location information (aggregation points 01, 02, and 03 in FIG. 1) and aggregation points with unknown location information (aggregation point 04 in FIG. 1).

Figure 2:
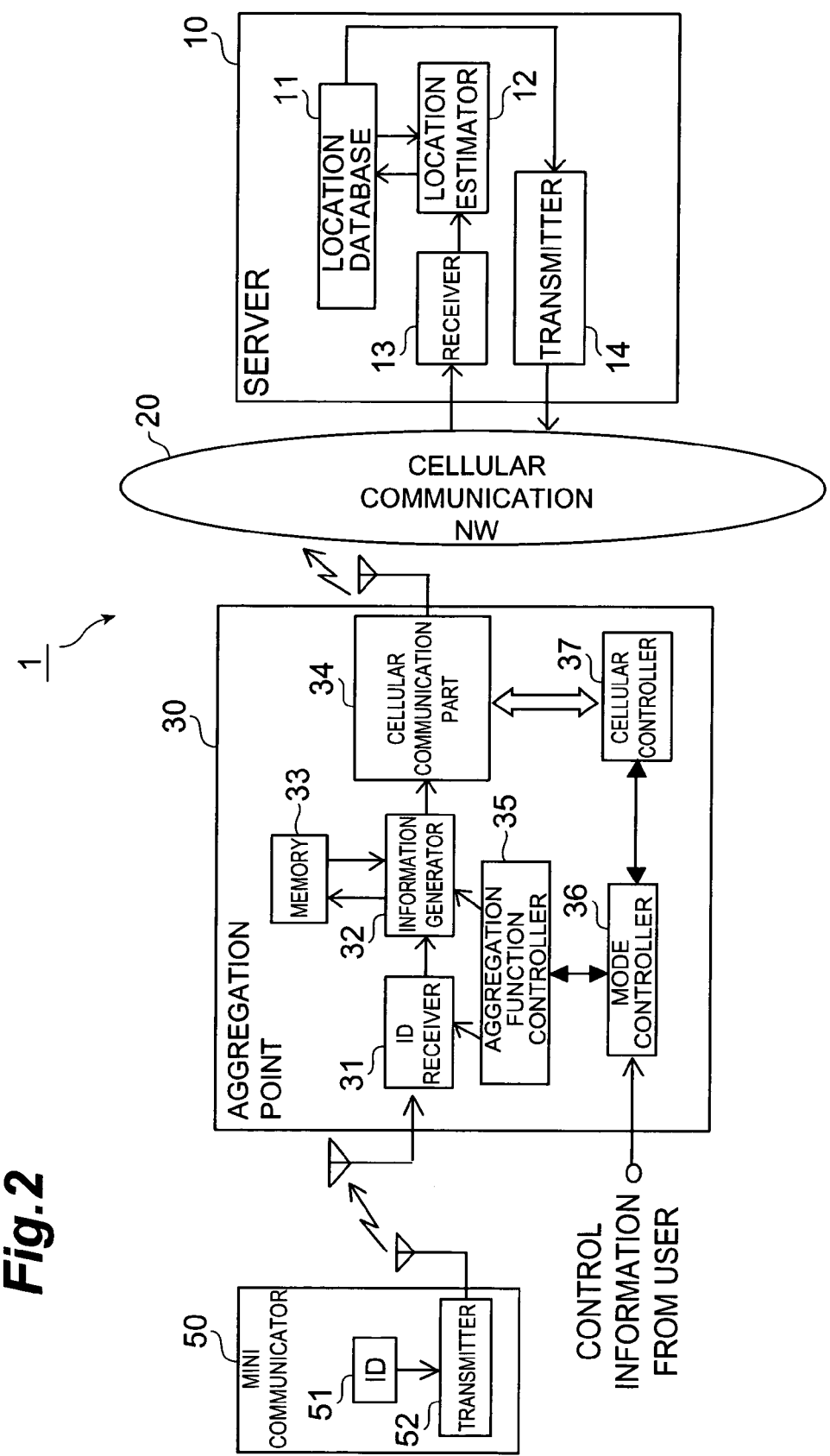
FIG. 2 is a functional block diagram of the communication system in the first embodiment.

FIG. 2 shows a functional block diagram of communication system 1. As shown in the same figure, RFID (mini-communicator) 50 is comprised of ID storage part 51 constructed of a ROM or the like storing an ID of its own, and transmission part 52 for transmitting the ID information through a radio link. In some cases the ID of RFID 50 contains owner identification information indicating an owner of the RFID 50.

Aggregation point 30 is comprised of cellular communication part 34 which implements communication with server 10 or another terminal via cellular communication network 20; ID receiving part 31 which receives the ID information from RFID 50 and measures the reception intensity of a received radio wave; information generating part 32 which generates transmission information to server 10, containing the ID information of RFID 50, the ID information of the aggregation point 30, and the reception intensity of the received radio wave, and which makes the generated transmission information transmitted to the server 10; memory 33 which memorizes an after-described RFID list; mode control part 36 which receives a switching signal for switching among three modes described later and which performs a mode switching control based on the received switching signal; aggregation function control part 35 which makes the ID receiving part 31 and information generating part 32 perform an awaiting-receiving operation according to a predetermined algorithm when receiving an on signal to activate the RFID information receiving function from mode control part 36; and cellular control part 37 which actuates the cellular communication part 34 when receiving an on signal to activate the cellular communication function from mode control part 36.

Server 10 is comprised of receiving part 13 which receives information via cellular communication network 20; transmitting part 14 which transmits information via cellular communication network 20; location database 11 which stores location information of RFID 50 and aggregation point 30; and location estimating part 12 which estimates a location of an RFID or aggregation point and updates the location database 11 by the estimated location information.

Figure 3:
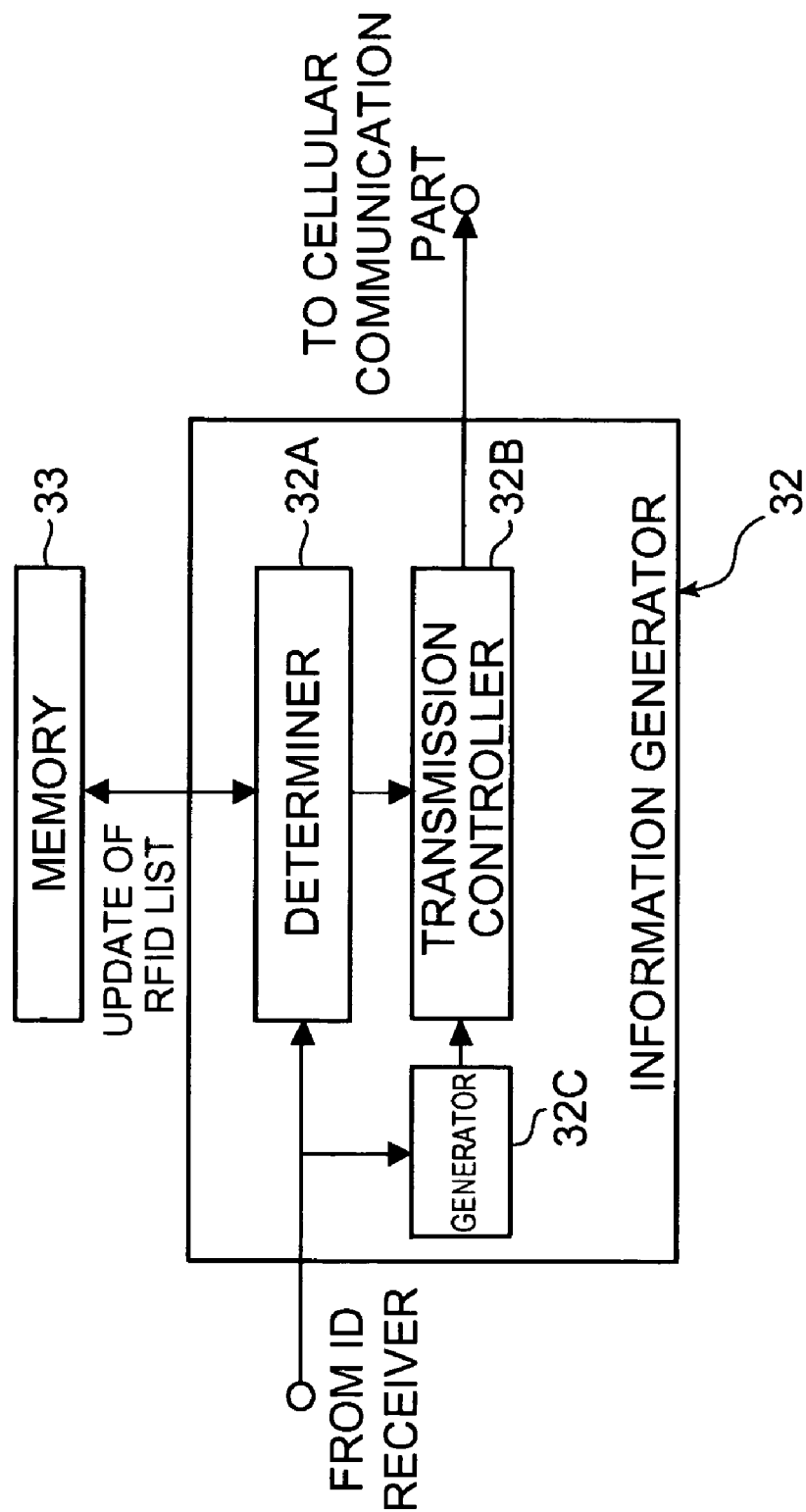
FIG. 3 is a functional block diagram of an information generating part incorporated in an aggregation point.

FIG. 3 shows a functional block diagram of information generating part 32 incorporated in aggregation point 30. As shown in the same figure, the information generating part 32 is comprised of generator 32C which generates the transmission information to server 10, containing the ID information of RFID 50, the ID information of the aggregation point 30, and the reception intensity of the received radio wave; determining part 32A which compares an ID of a mini-communicator which the aggregation point is able to receive at the present time, with the stored IDs of mini-communicators to determine whether there is a difference; and transmission control part 32B which makes the cellular communication part 34 transmit the transmission information to server 10 in a predetermined case where it is determined at least once that there is a difference. When the determining part 32A determines through the above comparison that there is a difference, it updates the IDs of RFIDs stored in memory 33.

Aggregation point 30 can be constructed, for example, on the basis of a cell phone or the like. In this case, hardware can be implemented using the CPU, DSP, memory, etc. with which the cell phone is originally provided, with addition of software, while it is necessary to add the hardware including the aforementioned ID receiving part 31 and an antenna connected thereto.

It is, however, also possible to construct aggregation point 30, by only adding software on the basis of the cell phone or the like. This will be described later.

Aggregation point 30 may also be further provided with a means for amplifying a radio wave in the cellular communication network to implement relaying thereof. In this case, aggregation point 30 functions as a relay station during execution of cellular communication of another aggregation point located at a site where the radio wave in the cellular communication network is weak, e.g., in downtown underground areas, in mountain areas, etc., to support the cellular communication of the other aggregation point.

Figure 5:
FIG. 5 is a table showing an example of a location code correspondence table.
Figure 6:
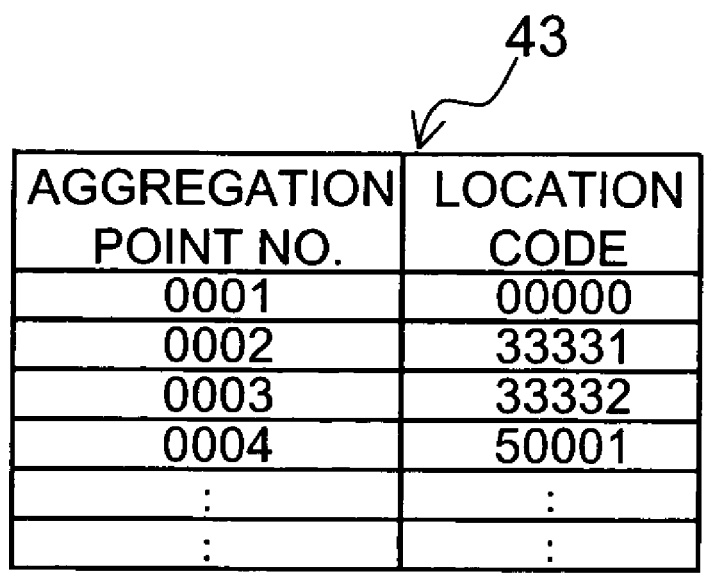
FIG. 6 is a table showing an example of a location database of aggregation point.

In passing, the location database 11 incorporated in server 10 in FIG. 2, is comprised of RFID location database 41 for managing the location information of RFIDs, as shown in FIG. 4; location code correspondence table 42 defining contents of respective location codes, as shown in FIG. 5; and aggregation point location database 43 for managing the location information of aggregation points, as shown in FIG. 6.

As shown in FIG. 4, RFID location database 41 stores ID numbers of RFIDs, numbers of aggregation points having received the radio wave from the RFIDs, location codes of the RFIDs, up-to-date update times of update of information, owner numbers indicating owners of the RFIDs, and reception intensity information of the radio wave from the RFIDs.

As shown in FIG. 5, location code correspondence table 42 contains definitions to define the contents of the location codes (specific location information) in correspondence with the respective location codes. It is noted here that "entered by user" in parentheses in the location information indicates location information entered into the database by the user (e.g., the administrator of the communication system) himself or herself and that "estimated" indicates location information estimated by location estimating part 12.

As shown in FIG. 6, aggregation point location database 43 stores location codes indicating present locations of aggregation points in correspondence with numbers of the respective aggregation points.

[Description of Various Processings in Communication System]

The mode switching processing in FIG. 7 and sequential processing concerning the RFID location estimation in FIG. 8 will be described below in order, as processings in communication system 1 of the configuration as described above.

Figure 29A:
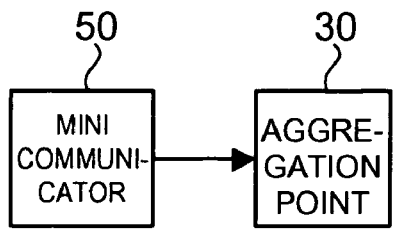
FIG. 29A is an illustration for explaining the RFID receive mode.
Figure 29B:
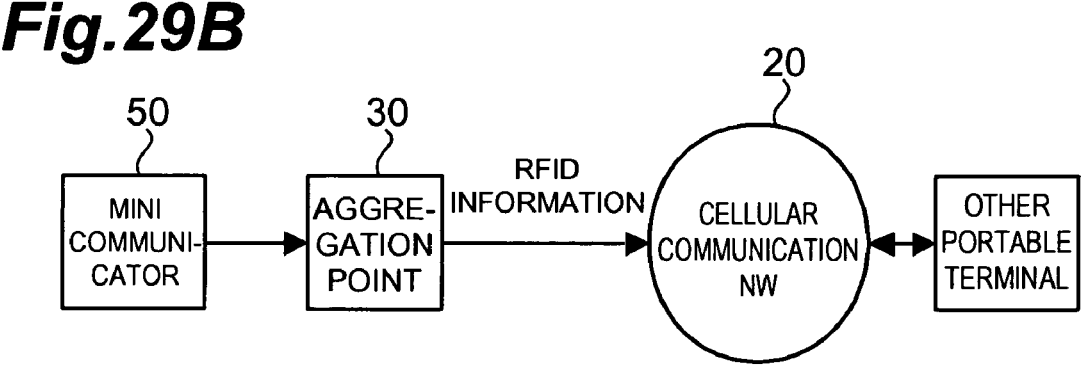
FIG. 29B is an illustration for explaining the dual mode.
Figure 29C:
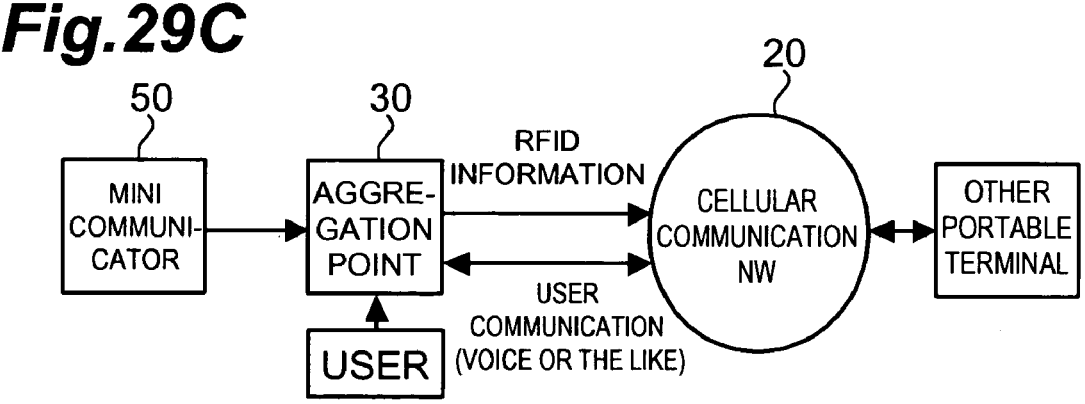
FIG. 29C is an illustration for explaining the dual mode.
Figure 29D:
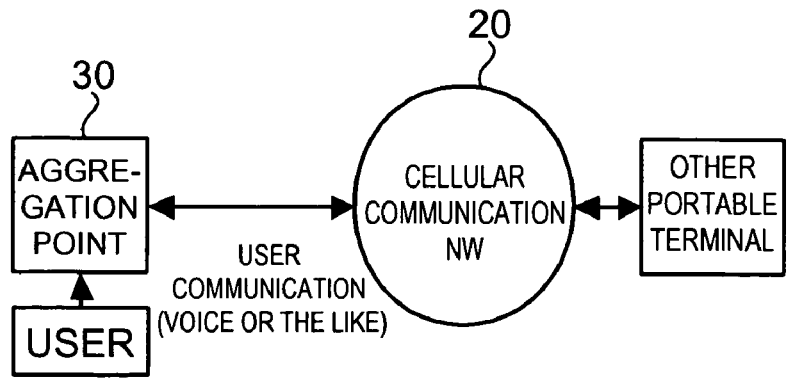
FIG. 29D is an illustration for explaining the cellular communication mode.

The modes employed herein are the following three modes: "RFID information receive mode" in which only the RFID information receiving function is active; "cellular communication mode" in which only the function as a mobile terminal of cellular communication is active at aggregation point 30; "dual mode" in which the both functions are active. The "RFID information receive mode" among these corresponds to a case where aggregation point 30 performs only reception of ID information from RFID 50 as shown in FIG. 29A; the "cellular communication mode" to a case where aggregation point 30 performs only user communication (voice calls or the like) via cellular communication network 20 like ordinary potable terminals as shown in FIG. 29D. The "dual mode" corresponds to a case where aggregation point 30 performs both the reception of ID information from RFID 50 and communication with cellular communication network 20 as shown in FIGS. 29B and 29C. The "communication with cellular communication network 20" involves a case where aggregation point 30 only transmits RFID information based on ID information from RFID 50 to cellular communication network 20 as shown in FIG. 29B, and a case where aggregation point 30 performs both the transmission of RFID information based on ID information from RFID 50 and the user communication (voice calls or the like) as shown in FIG. 29C.

[Mode Switching Processing]

The mode switching processing is executed by mode control part 36 of aggregation point 30 when the aggregation point receives a switching signal from server 10 or when the administrator of the communication system or the like directly enters it. As shown in FIG. 7, first, mode control part 36 receives control information about mode switching through the reception of the switching signal from server 10 or through the direct entry from the administrator of the communication system or the like (S01). Then the mode control part 36 determines whether the content of the control information is a switching request into the cellular communication mode (S02) and determines whether it is a switching request into the RFID information receive mode (S03)

When the content of the control information is a switching request into the cellular communication mode, the mode control part 36 transmits an activation control signal of cellular communication function to cellular control part 37 in order to activate only the cellular communication function (S04). Then the cellular control part 37, receiving the activation control signal of cellular communication function, activates the cellular communication part 34, whereby aggregation point 30 comes to operate as an ordinary cell phone. In the cellular communication mode, aggregation point 30 performs neither the ID reception from RFID 50 nor the generation of information.

When the content of the above control information is a switching request into the RFID information receive mode, the mode control part 36 transmits an activation control signal of RFID information receiving function to aggregation function control part 35 in order to activate the RFID information receiving function (S05). Thereafter, aggregation function control part 35, receiving the activation control signal of RFID information receiving function, makes the ID receiving part 31 and information generating part 32 perform the awaiting-receiving operation according to the predetermined algorithm. The awaiting-receiving operation of ID receiving part 31 in this case is controlled so as to keep the receiving operation off during unnecessary periods as much as possible and keep the ID receiving part 31 on only during necessary and sufficient periods. For example, it is feasible to perform such an operation as to activate ID receiving part 31 in agreement with intermittent radio wave transmission cycles from RFID 50, i.e., as to deactivate ID receiving part 31 during time zones without reception of the radio wave from RFID 50.

On the other hand, when the content of the above control information is a switching request into the dual mode, the mode control part 36 transmits an activation control signal of cellular communication function to cellular control part 37 and an activation control signal of RFID information receiving function to aggregation function control part 35, in order to activate both the cellular communication function and the RFID information receiving function (S06). This results in activating each of the cellular communication function and the RFID information receiving function as described above.

Figure 7:
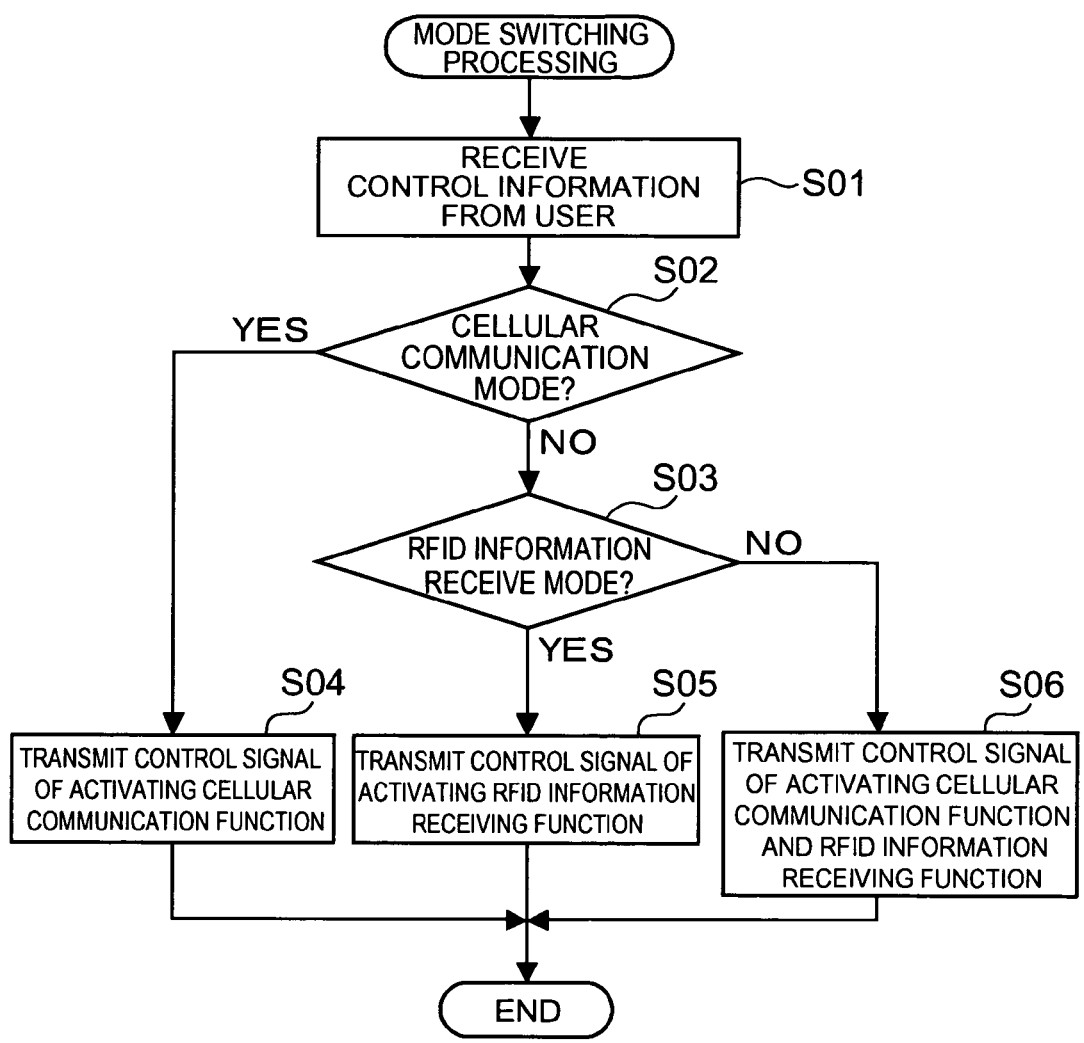
FIG. 7 is a flowchart showing mode switching processing.

The processing of FIG. 7 described above enables appropriate switching among the three modes in accordance with the content of the received control information. If the administrator side of the communication system is allowed to set and control the above three modes (e.g., if the administrator of the communication system is allowed to set and control the modes through the server), it can control the modes used by the users, whereby it becomes possible to reduce charges on the users if required resources in the communication system can be cut down.

In the RFID information receive mode, aggregation point 30 transmits no information through cellular communication network 20. Namely, in the cellular communication mode the user is allowed to perform communication through the cellular communication network 20 anytime when necessary, whereas in the RFID information receive mode the user is not allowed to perform communication through cellular communication network 20. In the RFID information receive mode no resource is consumed in the cellular communication network 20, and thus there is a room for reduction in charges on users.

During periods in the dual mode, as shown in FIGS. 29B and 29C, aggregation point 30 transmits generated RFID information through cellular communication network 20. However, the timing of transmission of the RFID information is controlled by cellular communication network 20 and aggregation point 30 (user side) is not allowed to set the transmission timing. For example, where the traffic is heavy in the cellular communication network 20, the aggregation point holds for a while and transmits the information after receiving a permission from cellular communication network 20. In another example, where the traffic is heavy in the cellular communication network 20, aggregation point 30 is assigned a channel of a small capacity for transmission of the RFID information therefrom; and where the traffic is low in cellular communication network 20, aggregation point 30 is assigned a channel of a large capacity for transmission of the RFID information therefrom. Here the cases where the traffic is heavy in the cellular communication network 20 involve a case where the traffic is heavy because of transmission and reception of high volume of data between another portable terminal and cellular communication network 20, and a case where the traffic is heavy because of transmission and reception of high volume of data between the aggregation point 30 itself and cellular communication network 20.

[Sequential Processing about RFID Location Estimation]

The sequential processing about the RFID location estimation in FIG. 8 will be described below. As shown in FIG. 8, at aggregation point 30 the ID receiving part 31 receives ID information transmitted by a radio wave from RFID 50 and measures the reception intensity of the radio wave (S11). Then information generating part 32 generates a list of RFIDs existing in the area of the aggregation point 30 (in-area RFID list), based on the ID information acquired from ID receiving part 31, and retrieves a most recent RFID list recorded in memory 33 (S12). Then information generating part 32 compares the in-area RFID list with the most recent RFID list to determine whether they are equal (S13). When they are equal, the information generating part 32 terminates the processing, while executing neither creation of transmission information nor transmission of transmission information to the server as described later. There are a variety of conceivable cases as criteria for determining that the two RFID lists are different (not equal) at S13 in FIG. 8. Namely, a determination of being different may be made if there is a difference between IDs even once out of a predetermined number of times or if there is a difference a predetermined number of continuous times. It is also possible to control the operation as described above, so as to be performed for only RFIDs corresponding to a designated owner number.

On the other hand, if the in-area RFID list is different from the most recent RFID list at S13, the RFID list recorded in memory 33 is updated by the in-area RFID list and the transmission information to server 10 is generated (S14). The "transmission information" herein is comprised, for example, of the ID information of RFID, reception time information of the ID information, reception intensity information of the radio wave received, and the ID information of the aggregation point 30. Then the generated transmission information is transmitted to server 10 (S15) and the processing at the aggregation point is terminated.

The server 10 on the other side receives the transmission information from aggregation point 30 (T11), and estimates the location of RFID 50 corresponding to the transmission information, based on the received transmission information, the pre-stored location information of RFID 50, and the pre-stored location information of aggregation point 30 (T12). A specific example of the location estimation processing herein will be described later. Then the location database of RFID 50 is updated by the estimated location information (T13).

A specific example of the location estimation processing at T12 will be described below referring to FIG. 1. We shall first note aggregation point 01 in FIG. 1. The location of aggregation point 01 itself is known and is registered with the location database 11 of server 10. The aggregation point 01 is receiving radio waves from the following three RFIDs. The three RFIDs from the left in FIG. 1 are an independent RFID 01 with known location information, an RFID attached to notebook PC 01 with unknown location information, and an RFID attached to a board with known location information. The aggregation point 01 transmits ID numbers received from the respective RFIDs and radio wave intensity information measured for received radio waves from the respective RFIDs, via cellular communication network 20 to server 10.

Now, suppose we want to estimate the location of notebook PC 01 on the basis of the information from the aggregation point 01. A comparison is made among three radio wave intensities of the received radio wave from independent RFID 01 with known location information, the received radio wave from the board with known location information, and the received radio wave from notebook PC 01 as an object for estimation. The distance from notebook PC 01 to aggregation point 01 can be estimated by making use of the property that the intensity of a radio wave is reciprocal to the distance to a point of transmission of the radio wave. In like manner the distance from notebook PC 01 to aggregation point 02 can also be estimated by comparing the radio wave intensities of received radio waves from the respective independent RFID 01, board, and notebook PC 01 as an object of estimation measured at aggregation point 02. Furthermore, two circles with the center at each of the aggregation points 01, 02 are drawn according to the estimated distances, and it can be estimated that the notebook PC 01 is located near intersections between these circles. Which intersection should be adopted out of the two intersections between the circles can be determined, for example, by detecting an incoming direction of the radio wave from notebook PC 01 at aggregation point 01 or 02 and estimating the location of notebook PC 01 to be near the intersection between the circles falling on the incoming direction.

The situation of aggregation point 03 will be described below. The location of aggregation point 03 itself is registered with server 10 and this aggregation point 03 is receiving a radio wave from an RFID attached to notebook PC 02 and a radio wave from an independent RFID 03 with known location information. Now, suppose we want to roughly estimate the location information of this notebook PC 02. The aggregation point 03 transmits the radio wave intensity information of the received radio wave from the RFID of notebook PC 02 at the aggregation point 03 and the ID information of the RFID, and the radio wave intensity information of the received radio wave from the RFID of independent RFID 03 at the aggregation point 03 and the ID information of the independent RFID 03 via the cellular communication network 20 to server 10, and the distance from the notebook PC 02 to the aggregation point 03 can be estimated by comparing the two radio wave intensities in a manner similar to the above. The location of the notebook PC 02 is then estimated to be on a circle of radius equal to thus estimated distance with the center at the aggregation point 03. Furthermore, since the radio wave from the RFID of the notebook PC 02 is received by the aggregation point 03 but not received by the aggregation point 04, it is estimated that the location of the notebook PC 02 is on the above circle and apart over a predetermined distance from the aggregation point 04.

Furthermore, a case of aggregation point 04 with its own position being unknown will be described. The aggregation point 04 receives radio waves from four RFIDs with known location (independent RFID 02, independent RFID 03, an RFID attached to a board, and an RFID attached to the aggregation point 03). Sets of radio wave intensities of the respective radio waves received and ID information items of the respective RFIDs are transmitted from the aggregation point 04 via cellular communication network 20 to server 10. The server 10 draws circles of radii according to the received radio wave intensities with the center at each of the independent RFID 02, independent RFID 03, board, and aggregation point 03 with their known location, and the location of the aggregation point 04 is estimated to be near intersections between them. The location information of the aggregation point 04 obtained by the estimation as described above is added to the location database 43 of aggregation points in FIG. 6.

Supposing the above aggregation point 04 is receiving a very strong radio wave from an RFID attached to a book with unknown location, it can be estimated that this book is located in the vicinity of the location of the aggregation point 04 estimated as described above.

Figure 8:
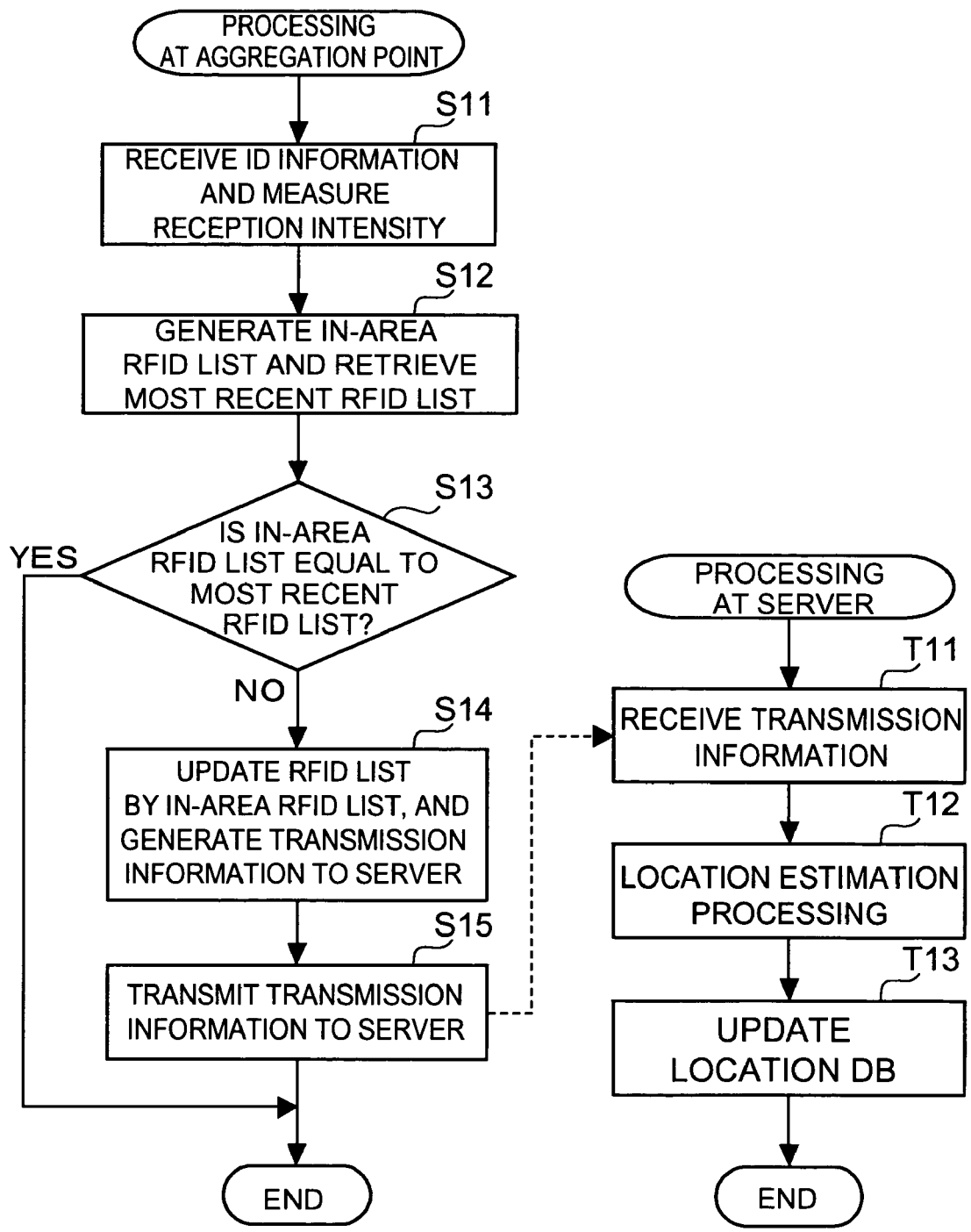
FIG. 8 is a flowchart showing sequential processing about RFID location estimation.

The processing in FIG. 8 as described above permits the server 10 to estimate the location of RFID 50 corresponding to the transmission information, whereby the location information of the RFID 50 is securely managed by the RFID location database.

Since the aggregation point 30 performs the estimation of location of RFID 50 and the update of the RFID location database only if the in-area RFID list is determined to be different from the most recent RFID list at S13, it is feasible to eliminate unnecessary location estimation processing and thereby implement efficient execution of processing.

Various Modifications about First Embodiment

Figure 28:
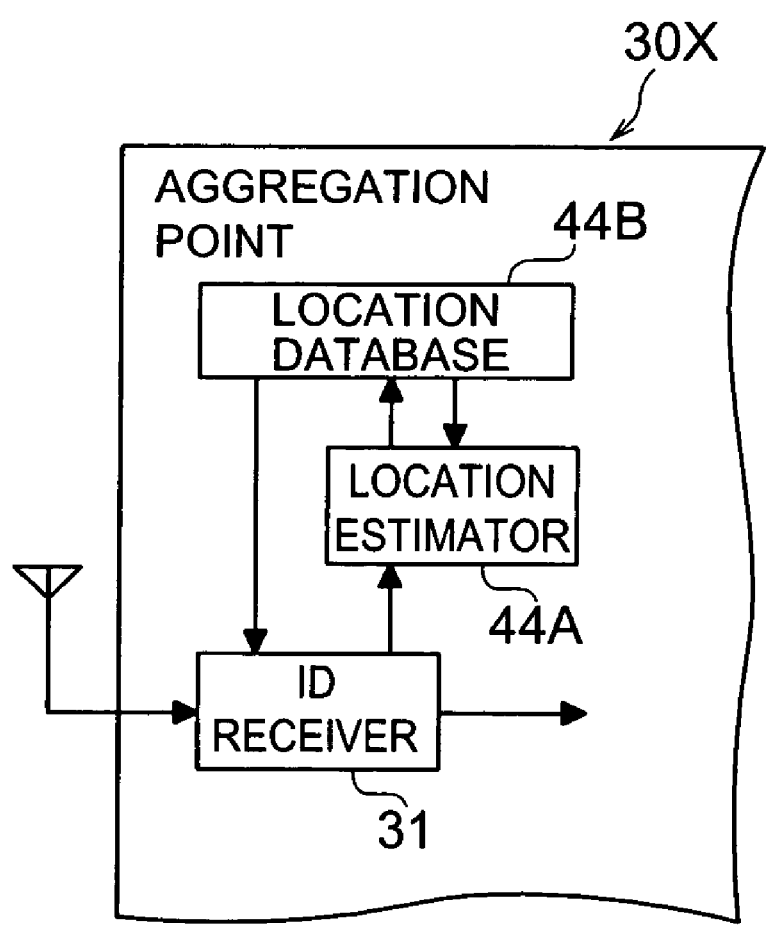
FIG. 28 is a functional block diagram of main part of the aggregation point provided with the RFID location estimating function.

The component for estimating the location of RFID 50 does not have to be limited to server 10, but may be the aggregation point 30. Namely, the aggregation point 30 is arranged to further receive from another aggregation point, other terminal information containing an ID of an RFID, the reception intensity of the radio wave from the RFID, and the location information of the other aggregation point, whereby the aggregation point 30 can estimate the location of the RFID in similar fashion to above, based on the reception intensity of the radio wave from the RFID measured by itself and on the other terminal information thus received. In this case, the processing load increases on each aggregation point, while there is the advantage that the traffic can be reduced in the cellular communication network. Specifically, as shown in FIG. 28, the aggregation point 30X is preferably configured to further comprise location database 44B memorizing the location information of RFIDs and other aggregation points, and location estimating part 44A for estimating the location of an RFID or another aggregation point and updating the location database 44B by the estimated location information. All the aggregation points may be provided with the foregoing location database 44B and location estimating part 44A, or it is also possible to adopt a configuration wherein only some of the aggregation points are provided with the foregoing location database 44B and location estimating part 44A so that the aggregation points with the location estimating function coexist with the aggregation points without the location estimating function.

Figure 9:
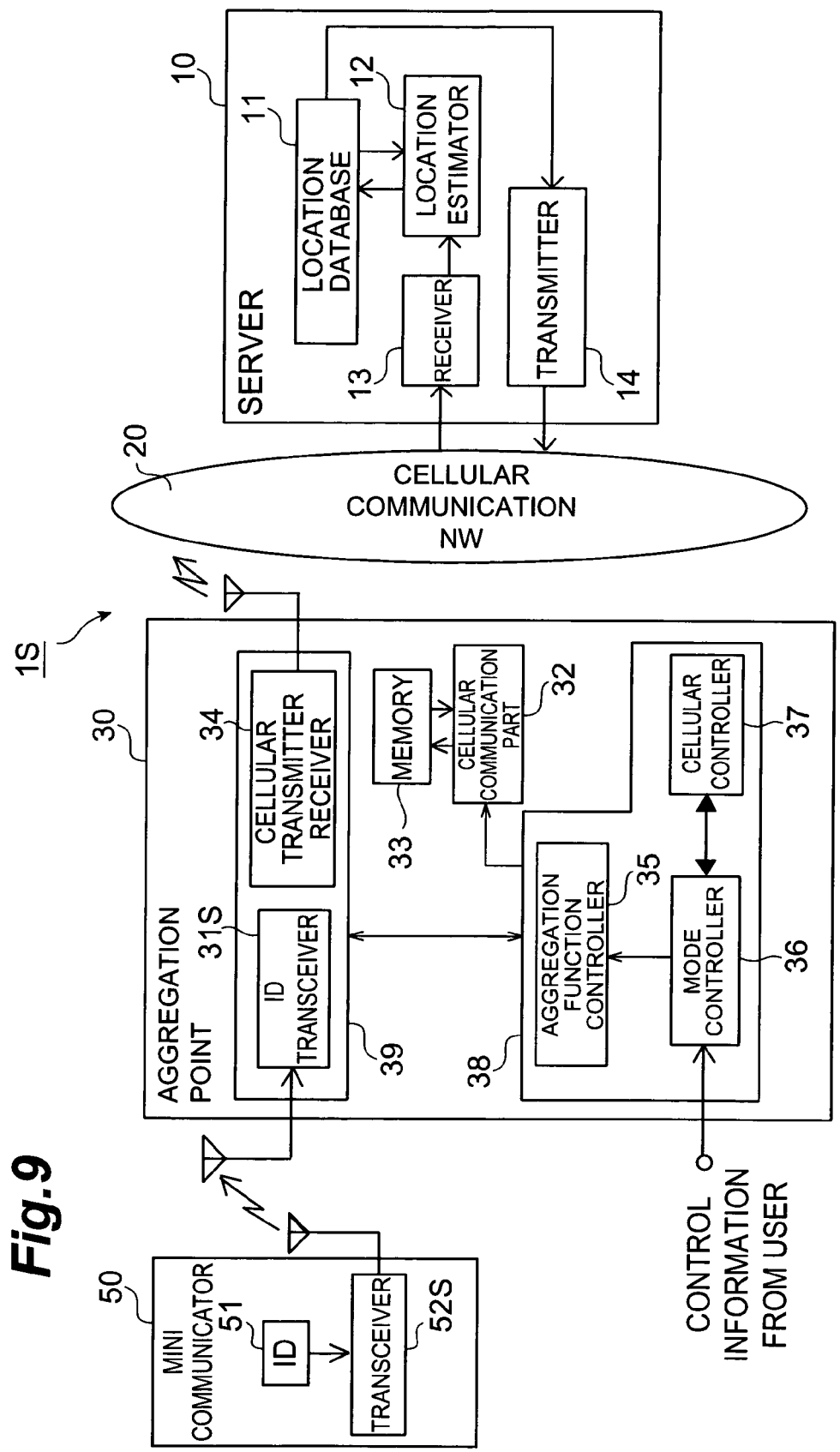
FIG. 9 is a functional block diagram showing a modification example of the communication system of the first embodiment.

The above embodiment illustrated the example using active RFIDs as RFIDs (mini-communicators), but the RFIDs may be passive RFIDs or semi-passive RFIDs. For example, communication system 1S shown in FIG. 9 can be employed as a configuration in that case. Namely, RFID 50 is provided with transmission-reception part 52S in place of the transmitting part. The aggregation point 30 is provided with ID transmission-reception part 31S in place of the ID receiving part; the ID transmission-reception part 31S and cellular communication part 34 constitute communication part 39; and this communication part 39 is configured to implement software wise switching between the ID transmission-reception function and the cellular communication function. The mode control part 36, cellular control part 37, and aggregation function control part 35 constitute control part 38, and this control part 38 is also configured to implement software wise switching between the ID transmission-reception function and the cellular communication function. In the communication system 1S as described above, much the same processing as in the above embodiment can be performed even in use of the passive RFIDs or semi-passive RFIDs as RFIDs, by adding a pre-process in which aggregation point 30 sends an ID information request to RFID (passive RFID or semi-passive RFID) 50.

Furthermore, it is also possible to implement the radio wave receiving process from RFIDs at ID receiving part 31, and the cellular communication process through cellular communication network 20 at cellular communication part 34, by software radio technology. Namely, all the controls of the radio modulation system and transmission system are carried out on a software basis and the radio wave transmission-reception functions of the antennas at ID receiving part 31 and at cellular communication part 34 can also be implemented on a software basis. In this case, for example, a program to control the processings of FIG. 7 and FIG. 8 is downloaded into preowned cell phones, whereby the processings in FIG. 7 and FIG. 8 can be implemented therein, with similar effect to that in the above embodiment.

Second Embodiment

The second embodiment will illustrate a configuration of RFID 50 for preventing interference.

There are cases in which a plurality of RFIDs 50 simultaneously transmit their radio waves to one aggregation point 30. For this reason, it is necessary to adopt some means for preventing interference among the radio waves from the RFIDs 50 at aggregation point 30. A solution is a method of preliminarily determining transmission intervals of radio waves from RFIDs 50 individually for the respective RFIDs and letting each RFID 50 transmit the radio wave at the transmission intervals determined. In use of this method, even if radio waves from different RFIDs 50 temporally overlap each other at a certain timing to cause interference, the radio waves will not temporally overlap each other at the next transmission timing, so as to prevent interference.

Figure 10:
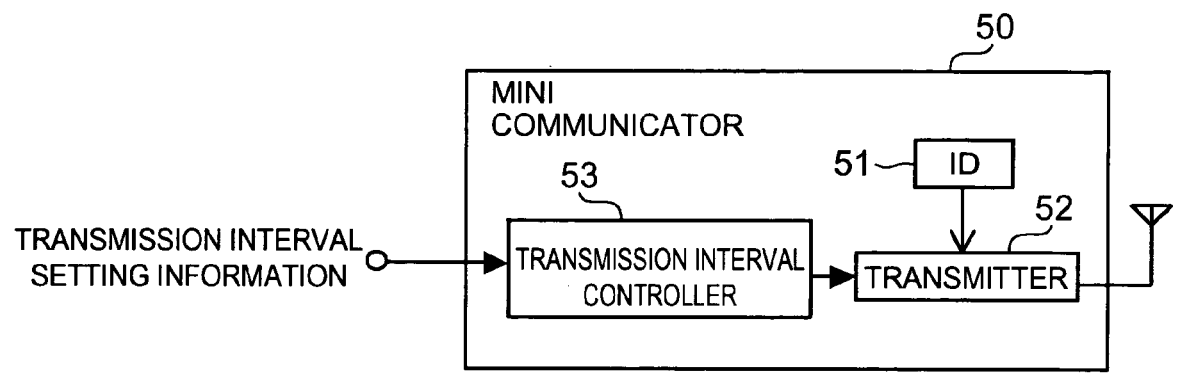
FIG. 10 is a functional block diagram showing the configuration of the RFID in the second embodiment.

Other methods include a method of randomly changing the transmission intervals of radio wave from the same RFID 50 by itself, a method of temporarily suspending transmission of the radio wave and resuming transmission thereafter, and soon. By employing these methods, it becomes feasible to prevent the interference among transmitted radio waves from RFIDs 50, while an average transmission interval is kept equal among all the RFIDs 50. A potential configuration is, as shown in FIG. 10, such that each RFID 50 is newly provided with transmission interval control part 53 of performing such control as to randomly change the transmission intervals of radio wave from the RFID and the transmission interval control part 53 controls the transmission operation of transmitting part 52.

Third Embodiment

Next, the third embodiment will illustrate an embodiment in which the aggregation point 30 authenticates whether an RFID 50 as a transmitter of a radio wave is a qualified one. In the present embodiment, specific configurations are provided in RFID (mini-communicator) 50 as shown in FIG. 11 and in ID receiving part 31 in aggregation point 30 as shown in FIG. 12.

Figure 11:
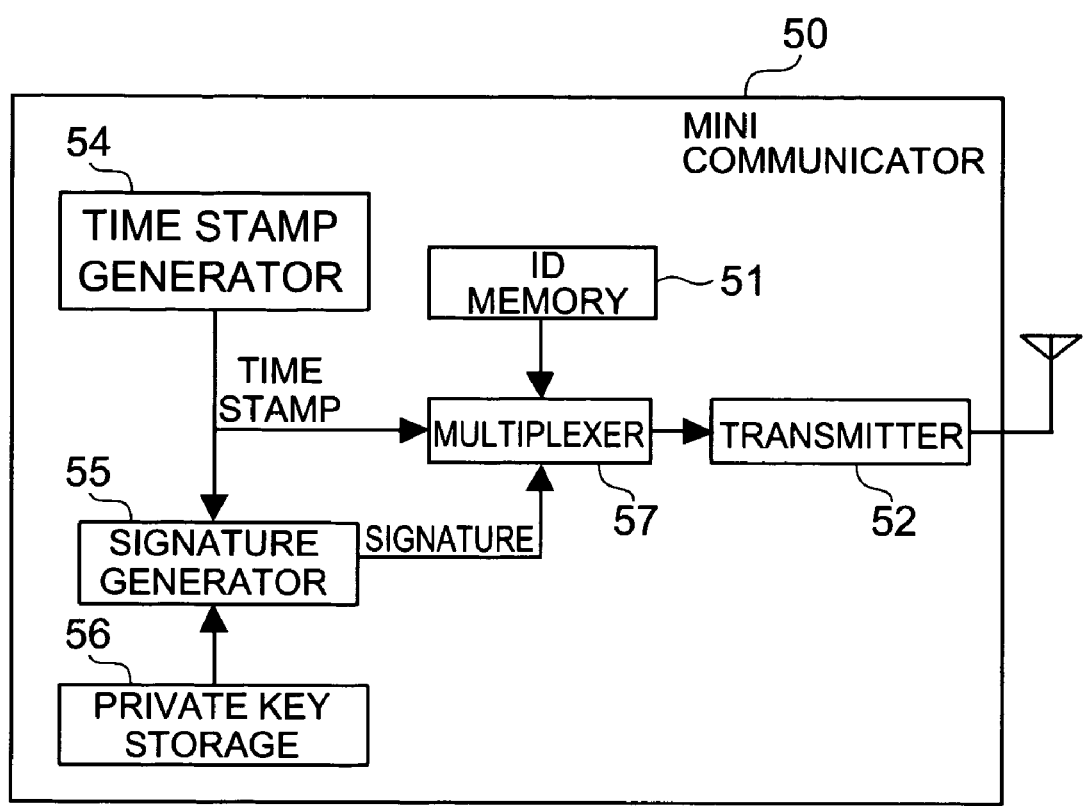
FIG. 11 is a functional block diagram showing the configuration of the RFID in the third embodiment.

As shown in FIG. 11, RFID 50 is comprised of time stamp generating part 54 which generates a time stamp indicating a transmission time of ID information; signature generating part 55 which generates an electronic signature; private key storage part 56 which stores a private key; ID memory part 51 comprised of a ROM or the like memorizing the ID information of the RFID; multiplexing part 57 which multiplexes the ID information, time stamp, and electronic signature; and transmission part 52 which transmits the multiplexed information through a radio link.

Figure 12:
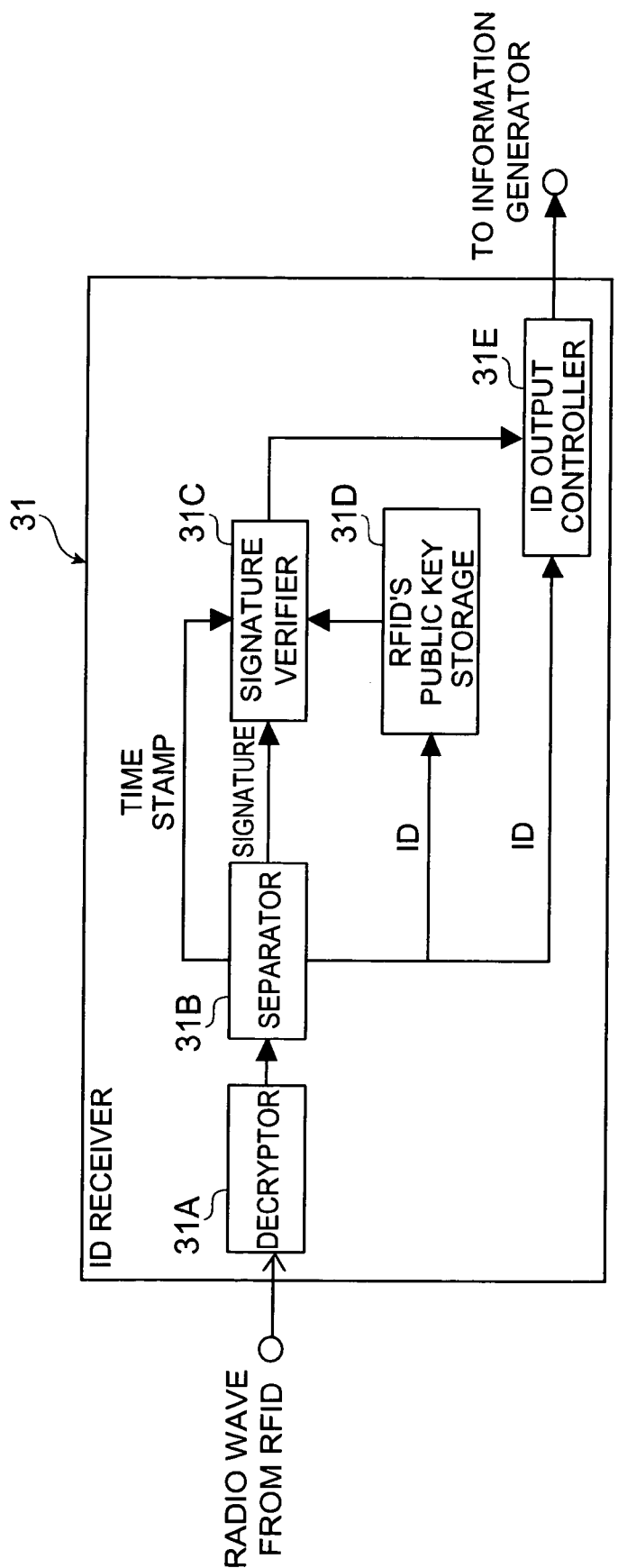
FIG. 12 is a functional block diagram showing a configuration of an ID receiving part in the third embodiment.

As shown in FIG. 12, ID receiving part 31 is comprised of decrypting part 31A which decrypts a signal from RFID 50; separating part 31B which separates information resulting from the decryption, into three information items of the time stamp, electronic signature, and ID information; storage part 31D for a public key of RFID 50, which stores the public key of RFID 50; signature verifying part 31C which retrieves the public key corresponding to the ID information from the public key storage part 31D and verifies the electronic signature through the use of the public key; and ID output control part 31E which outputs the ID information to information generating part 32 if the result of the verification is normal.

Figure 13:
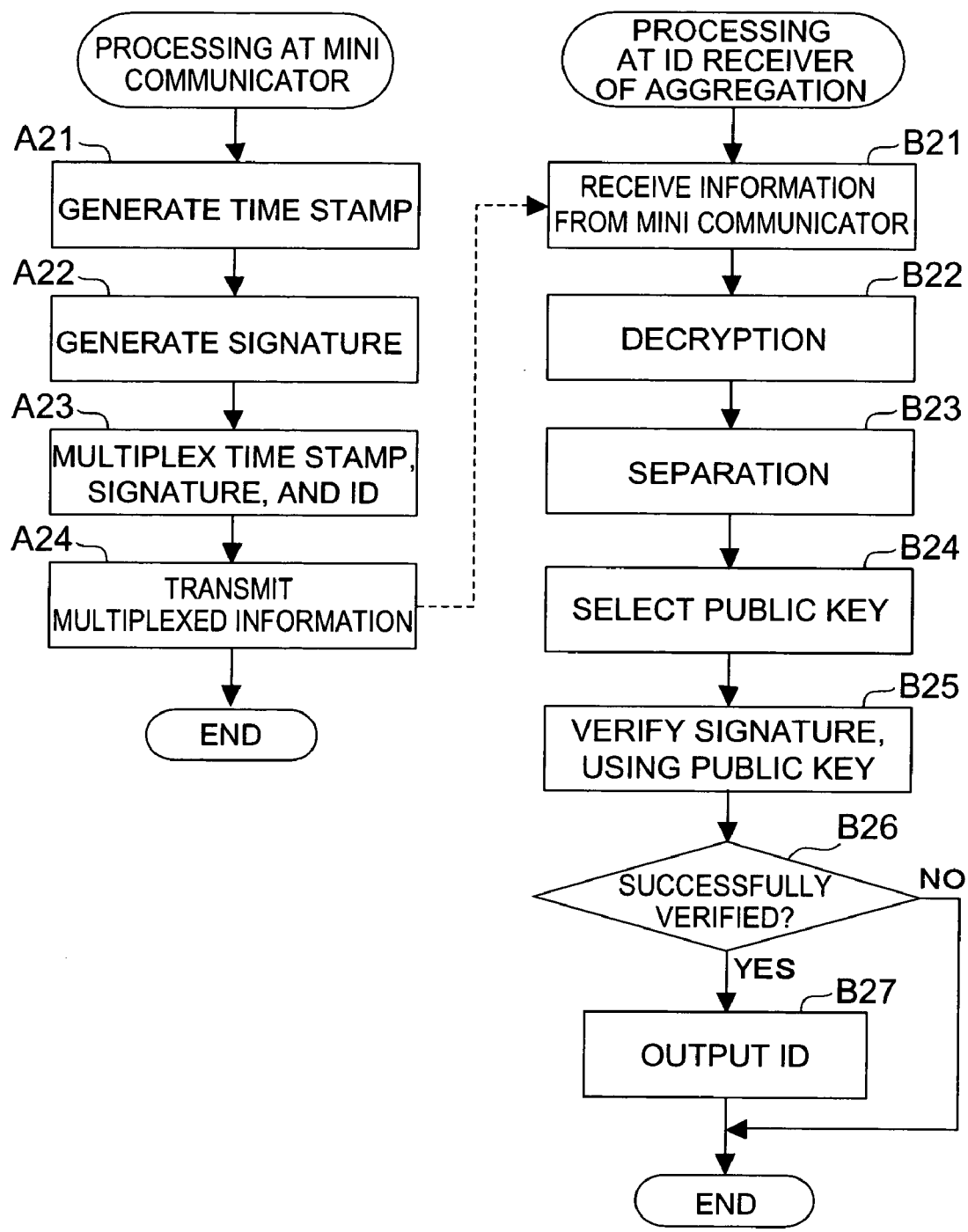
FIG. 13 is a flowchart showing sequential processing about authentication of the RFID.

The processing shown in FIG. 13 is executed by the RFID 50 and ID receiving part 31 of the configurations as described above. Namely, at RFID 50, time stamp generating part 54 generates a time stamp on every occasion of transmission of ID information (A21) and signature generating part 55 generates an electronic signature from the above time stamp through the use of the private key (A22). Then the multiplexing part 57 multiplexes the ID information retrieved from the ID memory part 51, and the time stamp and electronic signature thus generated (A23), and the transmitting part 52 transmits the information resulting from the multiplexing operation, through a radio link (A24).

When ID receiving part 31 receives the multiplexed information from RFID 50 (B21), decrypting part 31A decrypts the information (B22), and separating part 31B separates the information resulting from the decryption, into three information items of the time stamp, electronic signature, and ID information (B23). Then the signature verifying part 31C selects and retrieves the public key corresponding to the ID information from the public key storage part 31D (B24) and verifies the electronic signature through the use of the public key (B25). The verification here can be implemented as follows: for example, the electronic signature is entered into a predetermined verification function using the public key and it is determined whether an output value thereof agrees with the time stamp received along with the electronic signature. When the output value agrees with the time stamp, it is determined that the verification is successful; if the output value disagrees with the time stamp, it is determined that the verification is unsuccessful. Furthermore, when the result of the verification is normal, the ID output control part 31E outputs the ID information to information generating part 32 (B27). When the result of the verification is abnormal, however, the ID output control part 31E avoids the output of ID information and terminates the processing.

With the configurations and processing as described above, the aggregation point 30 is able to authenticate whether RFID 50 as a transmitter of a radio wave is a qualified one. Namely, only if RFID 50 is authenticated as a qualified one, the ID of the RFID 50 can be outputted to information generating part 32, whereby it is feasible to prevent unauthorized accesses and others of unqualified RFIDs to the present system in advance and thereby improve the security of the system.

The present embodiment illustrated the example using the time stamp, but it is noted that the present invention is not limited to this example and any function that can generate different information upon every transmission and that can generate the same output at aggregation point 30, can replace the time stamp.

The signature generating part 55 and signature verifying part 31C can use the public key cryptography. An algorithm therefore can be preliminarily determined and transmitted to aggregation point 30.

Application Example of Location Estimation Processing

Now, an application of the location estimation processing of RFID 50 described above will be outlined below as an example wherein a user (e.g., the administrator of the communication system or the like) requests the server 10 to search for a location of a desired article and in that case a location of RFID 50 attached to the article is searched for in the present communication system 1 (the processing in FIG. 14).

Figure 14:
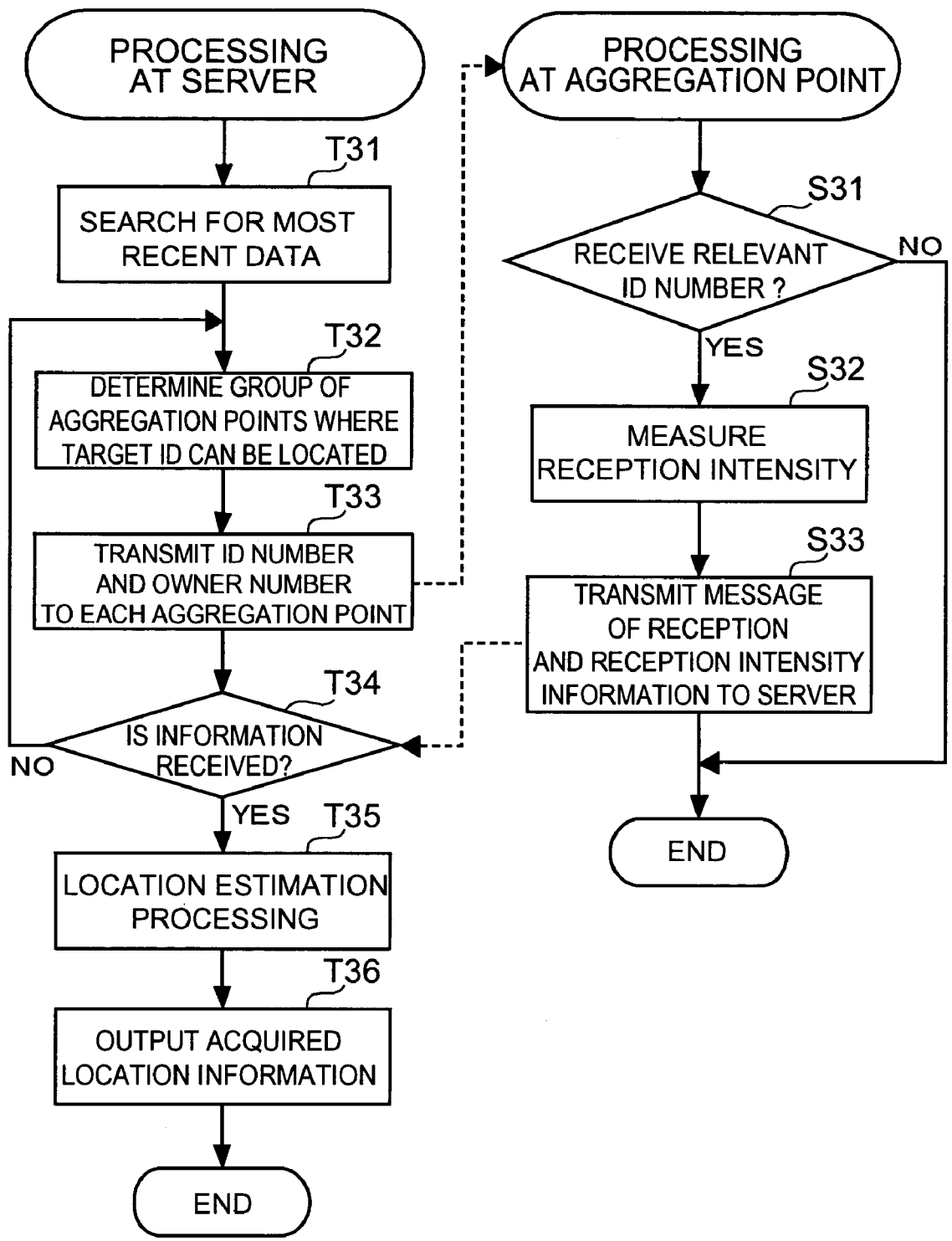
FIG. 14 is a flowchart showing sequential processing about a search for a specific RFID.

When server 10 receives a search request for a specific RFID 50 about a specific owner number, the processing of FIG. 14 is initiated. First, the RFID location database 41 is searched for up-to-date location data about the ID number (target ID) of the specific RFID 50 (T31). Then the server determines a group of aggregation points 30 where the RFID 50 with the target ID number can be located at present, from the site and time described in the location data, and the present time (T32), and then the server transmits the ID number information and owner number information to be searched for, to each of the aggregation points 30 belonging to the determined group (T33).

Each aggregation point 30, receiving the transmitted information, determines whether it is receiving the radio wave from the RFID 50 with the ID number (S31), and if it is not receiving the radio wave from the RFID 50 with the ID number, it will directly terminate the processing. On the other hand, if it is receiving the radio wave from the RFID 50 with the ID number, it measures the reception intensity of the radio wave (S32) and transmits a message telling the reception of the radio wave from the RFID 50 with the ID number and the reception intensity information acquired by the measurement, to server 10 (S33).

When the server 10 receives the message of reception of the radio wave and the reception intensity information from one of the aggregation points 30 (T34), it performs location estimation processing similar to that at T12 in FIG. 8 described previously (T35). After the processing, the server then outputs the location information obtained by the estimation (T36). For example, it can output the information by displaying it on a display device, by printing it out, or the like.

If server 10 receives no response from the aggregation points 30 within a predetermined period of time at T34, it returns to T32 to again execute the determination of a new group of aggregation points 30 and the transmission of the ID number information and owner number information to be searched for. The processes of T32 and T33 are assumed to be repeated a. predetermined number of times, before the RFID 50 with the ID number under a search is found.

Through the processing of FIG. 14 as described above, the communication system 1 is able to search for a location of a specific RFID 50 about a specific owner number.

Fourth Embodiment

Figure 15:
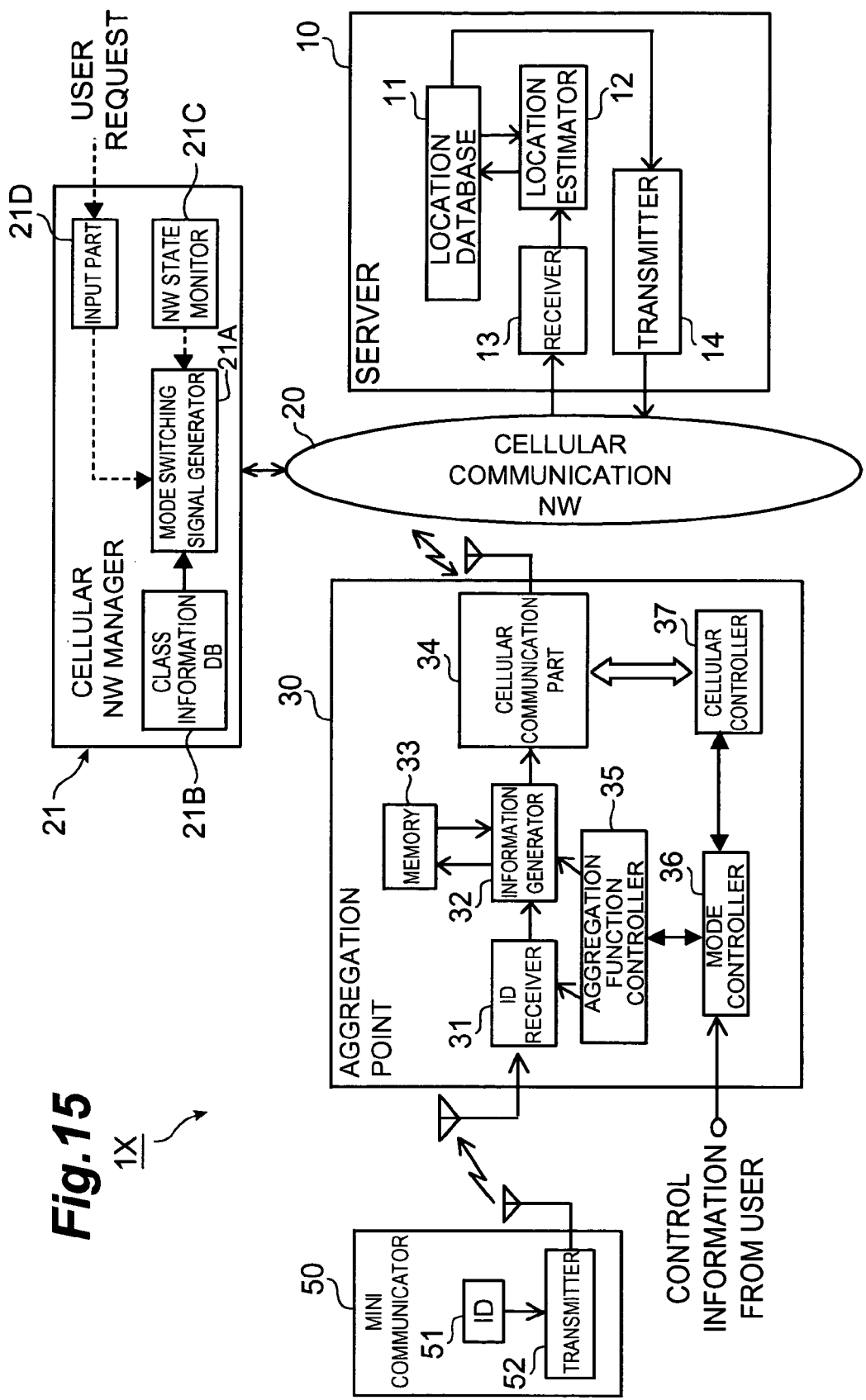
FIG. 15 is a functional block diagram of the communication system in the fourth embodiment.

Next, the fourth embodiment will illustrate an embodiment in which cellular network management part 21 managing the cellular communication network 20 performs the mode control described in the first embodiment. In communication system 1X shown in FIG. 15, cellular network management part 21 manages the cellular communication network 20. This cellular network management part 21 is comprised of at least mode switching signal generating part 21A which generates a mode switching signal for instructing aggregation point 30 to effect mode switching and which transmits the mode switching signal to aggregation point 30; and class information database 21B which stores class information defined for each aggregation point or for each user of an aggregation point (e.g., default mode-based class information defined according to the contract content of each user, or the like). In this case, the mode switching signal generating part 21A generates the mode switching signal according to the class information and transmits the signal to aggregation point 30.

Figure 16:
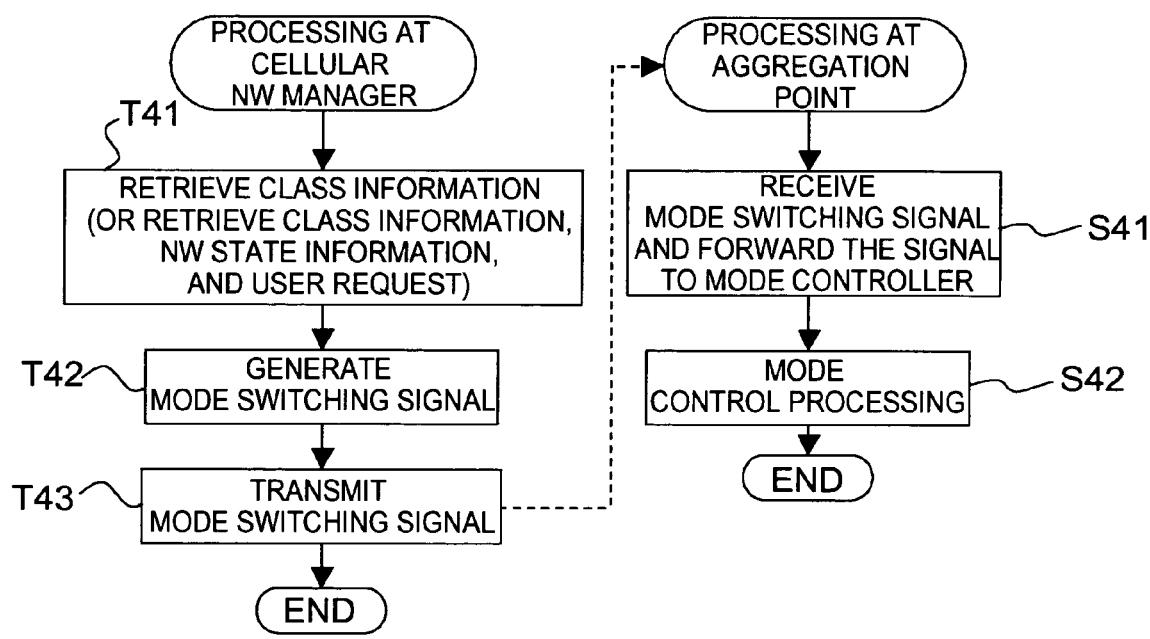
FIG. 16 is a flowchart showing processing at the server and processing at the aggregation point in the fourth embodiment.

As shown in FIG. 16, at cellular network management part 21, mode switching signal generating part 21A retrieves the class information about aggregation point 30 or aggregation point using user as a target from class information database 21B (T41) and generates the mode switching signal according to the class information (T42). For example, where the target aggregation point using user has a contract of the cellular communication mode for only cellular communication and the class information stored is one according to the cellular communication mode, the mode switching signal generating part 21A generates the mode switching signal to instruct the target aggregation point to effect switching into the "cellular communication mode" according to the class information. Then the cellular network management part 21 transmits the mode switching signal to the target aggregation point 30 (T43).

At the target aggregation point 30 on the other side, the cellular communication part 34 receives the foregoing mode switching signal and forwards the received mode switching signal via cellular control part 37 to mode control part 36 (S41). Then mode control part 36 executes the mode control processing according to the mode switching signal (S42), as in the first embodiment.

In the manner as described above, cellular network management part 21 generates the mode switching signal and transmits it to the target aggregation point 30, whereby it is feasible to execute the mode switching control predominantly by the cellular network management part 21.

It is also possible to adopt a configuration wherein cellular network management part 21 further comprises network state monitor part 21C which monitors the state of cellular communication network 20; and input part 21D for letting the network administrator (user) enter a user request about mode switching and wherein the mode switching signal generating part 21A generates the mode switching signal according to three information items of the class information, the state information of cellular communication network 20, and the input user request information, different from that containing only the class information. In this case, for example, where a user having a contract of the dual mode enters a request for temporary switching into the cellular communication mode, it is feasible to generate the mode switching signal into the cellular communication mode according to the user request. When the cellular communication network 20 is in a heavily congested state, it is feasible to generate the mode switching signal into the RFID information receive mode on the basis of the state information indicating the congested state, in order to automatically switch into the RFID information receive mode without execution of cellular communication. In the processing of FIG. 16, at T41 the mode switching signal generating part 21A retrieves each of the state information of cellular communication network 20 from network state monitor part 21C and the user request information from input part 21D, in addition to the class information about the target aggregation point 30 or aggregation point using user, and at T42 it generates the mode switching signal according to the three information items.

The predominant part for controlling the mode switching may be the cellular network management part 21 (network management software or network administrator) as described above, or may be the administrator of the server 10. It may also be a user of aggregation point 30 and in this case, for example, it is also possible to construct the system in a configuration wherein one aggregation point generates a mode switching signal to another aggregation point (i.e., an aggregation point of another user).

Fifth Embodiment

Figure 17:
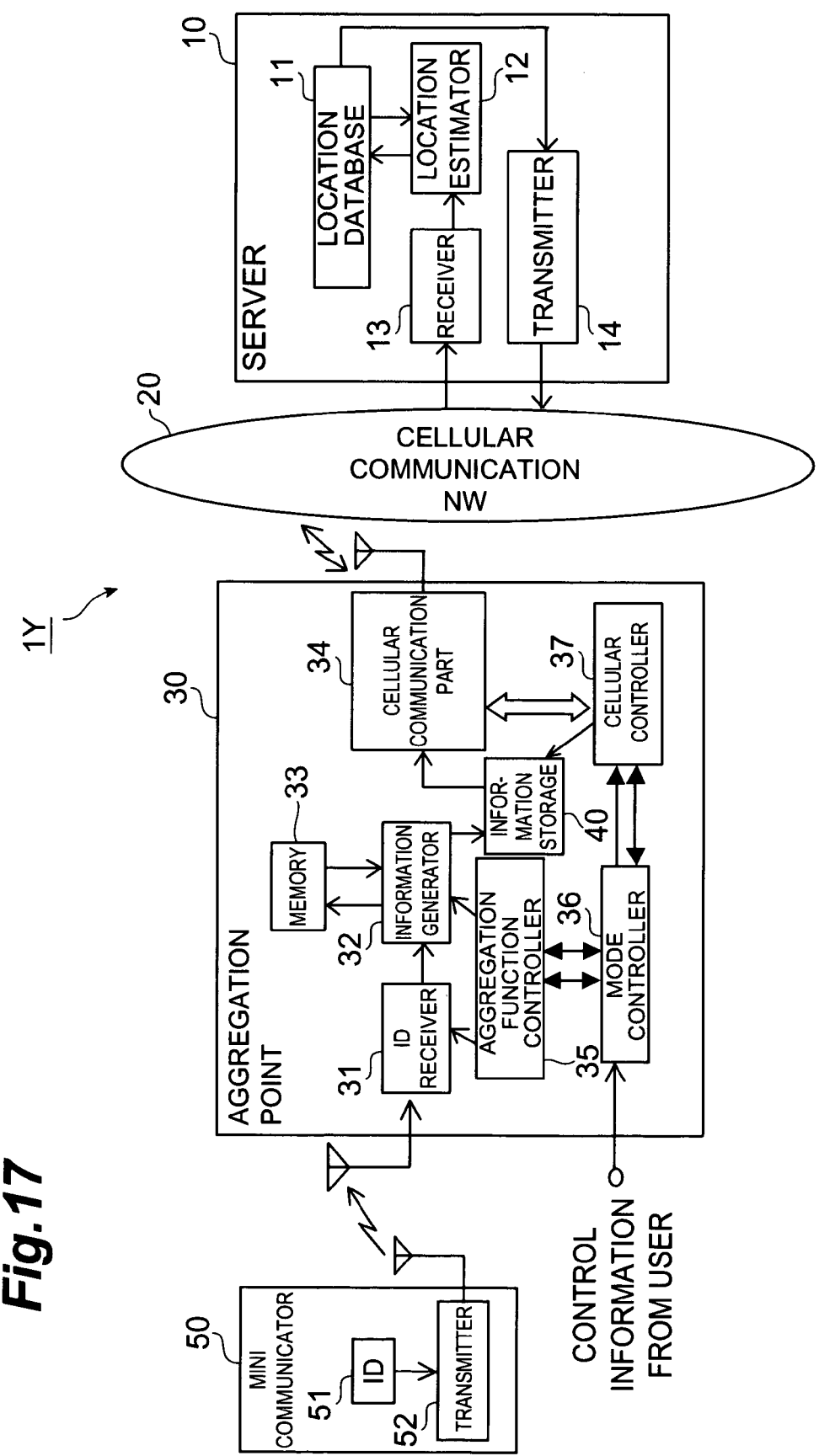
FIG. 17 is a functional block diagram of the communication system in the fifth embodiment.

Next, the fifth embodiment will illustrate an embodiment wherein an information storage part for aforementioned "transmission information" is further provided in aggregation point 30. As in communication system 1Y shown in FIG. 17, aggregation point 30 is further provided with information storage part 40 which receives the transmission information from information generating part 32 and stores it, and which controls the operation of outputting the transmission information to cellular communication part 34 or storing the transmission information, based on traffic information in cellular communication network 20 acquired from cellular control part 37.

Figure 18:
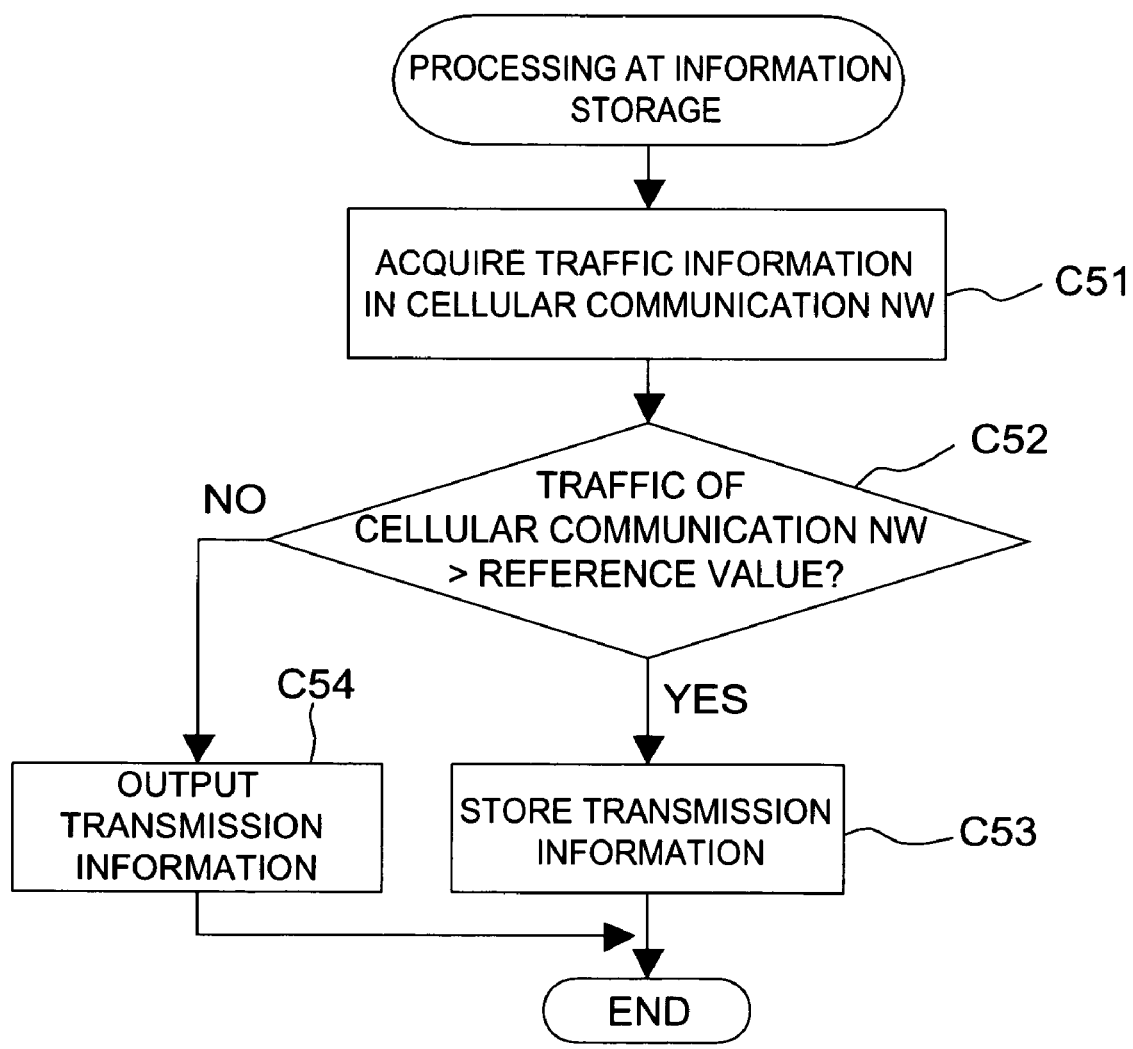
FIG. 18 is a flowchart showing processing at an information storage part in the fifth embodiment.

As shown in FIG. 18, information storage part 40 acquires the traffic information of cellular communication network 20 from cellular control part 37 (C51), and determines whether the traffic exceeds a predetermined reference value being a reference for suspension of output of transmission information (C52). When the traffic is not over the reference value herein, information storage part 40 outputs the transmission information previously stored, or received from information generating part 32, to cellular communication part 34 (C54) This results in transmitting the transmission information from cellular communication part 34 via cellular communication network 20 to server 30. On the other hand, when the traffic exceeds the reference value at C52, information storage part 40 suspends the output of transmission information and stores the transmission information (C53). This results in avoiding output of the transmission information to cellular communication network 20 where the traffic of cellular communication network 20 exceeds the reference value, whereby it is feasible to smooth the communication traffic in the cellular communication network 20.

Sixth Embodiment

Figure 19A:
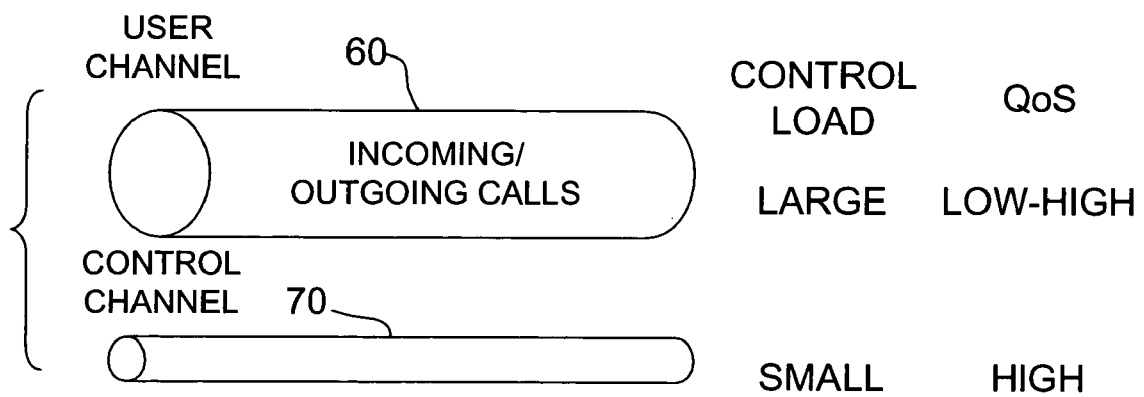
FIG. 19A is an illustration showing a channel configuration in the sixth embodiment.

Next, the sixth embodiment will illustrate an embodiment about a selection control of a channel used upon output of transmission information to cellular communication network 20 by cellular communication part 34 of aggregation point 30. Two types of channels, user channel 60 and control channel 70 shown in FIG. 19A, are used in output from cellular communication part 34 to cellular communication network 20. The control channel 70 of them is a channel for transmission of a control signal with small capacity of transmission, whereas the user channel 60 is a channel for transmission of user data with large capacity of transmission which is set or freed on every occasion of incoming/outgoing call control. Qualitatively, the control channel 70 involves no incoming/outgoing call control and it is thus conceivably often the case that the load of control is small but high QoS is required. Since the user channel 60 involves the incoming/outgoing call control, the load of control is large and required QoS varies depending upon situations.

Figure 20:
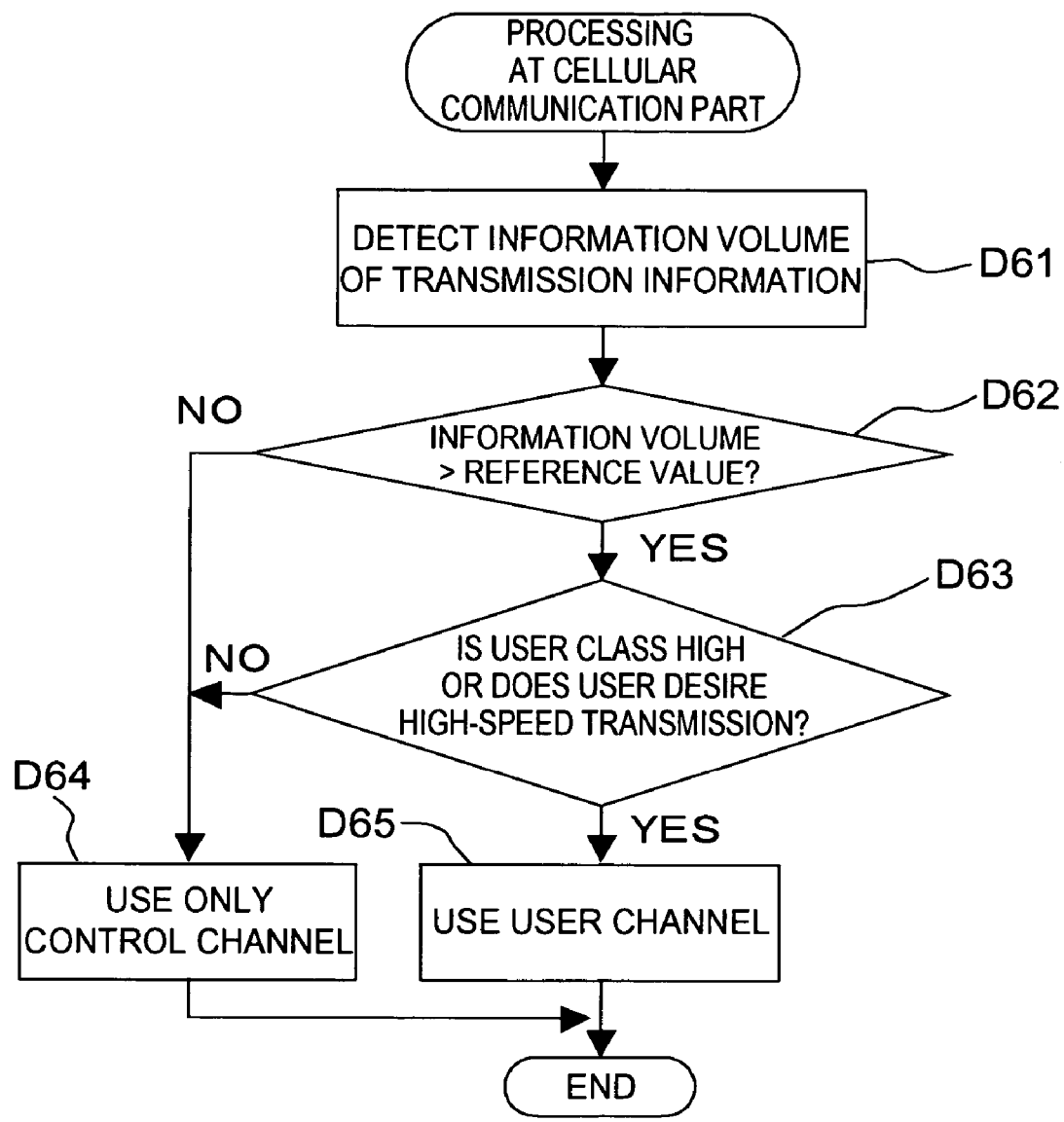
FIG. 20 is a flowchart showing processing at a cellular communication part in the sixth embodiment.

Which one of the above two channels the cellular communication part 34 should select and utilize upon output of the transmission information to cellular communication network 20 can be controlled according to the processing in FIG. 20.

Namely, cellular communication part 34 first detects the information volume of the transmission information to be transmitted at that point (D61), and it determines whether the information volume exceeds a predetermined reference value being a reference for making a determination on whether the volume is too high to transmit the information by only control channel 70 (D62). When the information volume is not over the reference value, cellular communication part 34 outputs the transmission information to cellular communication network 20 by using only the control channel 70 (D64).

If the information volume exceeds the reference value at D62, it is determined whether the present status is either a case where the user class is high (high quality service class) or a case where the user desires high-speed transmission (D63). When the determination herein is that the user class is high or that the user desires high-speed transmission, cellular communication part 34 transmits the transmission information to cellular communication network 20, using the user channel 60 with large capacity of communication (D65). In this connection, there are a case using both the user channel 60 and control channel 70, and a case using only the user channel 60.

When it is determined at D63 on the other hand that the user class is not high and that the user does not desire high-speed transmission, cellular communication part 34 uses only the control channel 70 to send the transmission information to cellular communication network 20 (D64).

Through the processing of FIG. 20 as described above, cellular communication part 34 is able to send the transmission information to cellular communication network 20 while properly using the two types of channels, user channel 60 and control channel 70, in accordance with the information volume of transmission information, the user class, and the presence/absence of a user's desire for high-speed transmission.

Figure 19B:
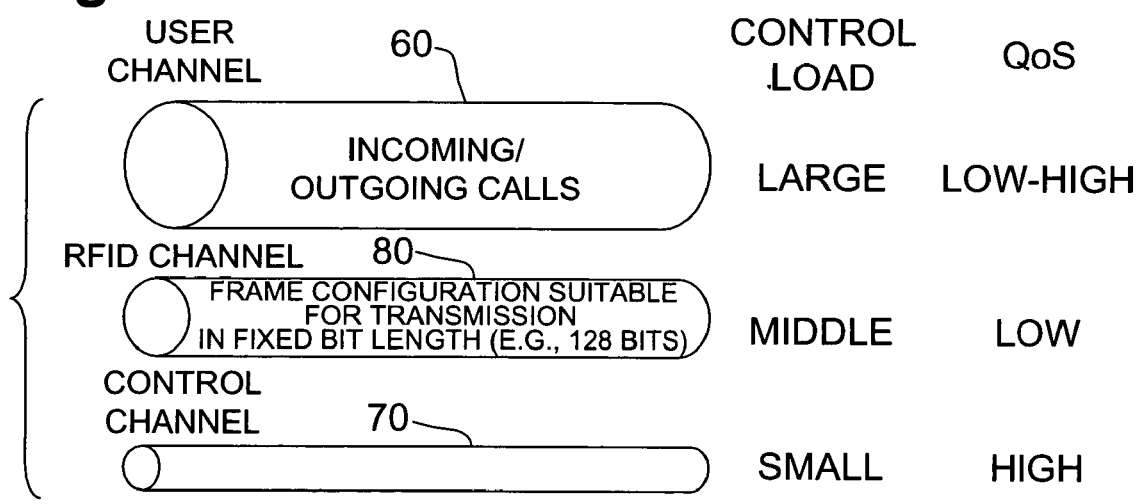
FIG. 19B is an illustration showing a modification of the channel configuration in the sixth embodiment.

It is also possible to further set another channel (RFID channel) 80 dedicated to transmission of the transmission information, in addition to the above two types of channels, as shown in FIG. 19B. This RFID channel 80 is a channel of frame structure suitable for transmission in fixed bit length (e.g., 128 bits) and with middle capacity of transmission. Qualitatively, as to the RFID channel 80, the load of control is middle and the degree of instancy required is not too high; it is thus conceivably often the case that low QoS is required.

Cellular communication part 34 uses the RFID channel 80 as described above to send the transmission information to cellular communication network 20, whereby it becomes feasible to eliminate the need for the switching control of used channel and thus reduce the control load. In a situation of transmitting too high volume of transmission information to be handled by only the RFID channel 80, however, the transmission information may be efficiently transmitted to the cellular communication network 20, using both or one of the user channel 60 and control channel 70, together with the RFID channel 80.

Seventh Embodiment

Figure 21:
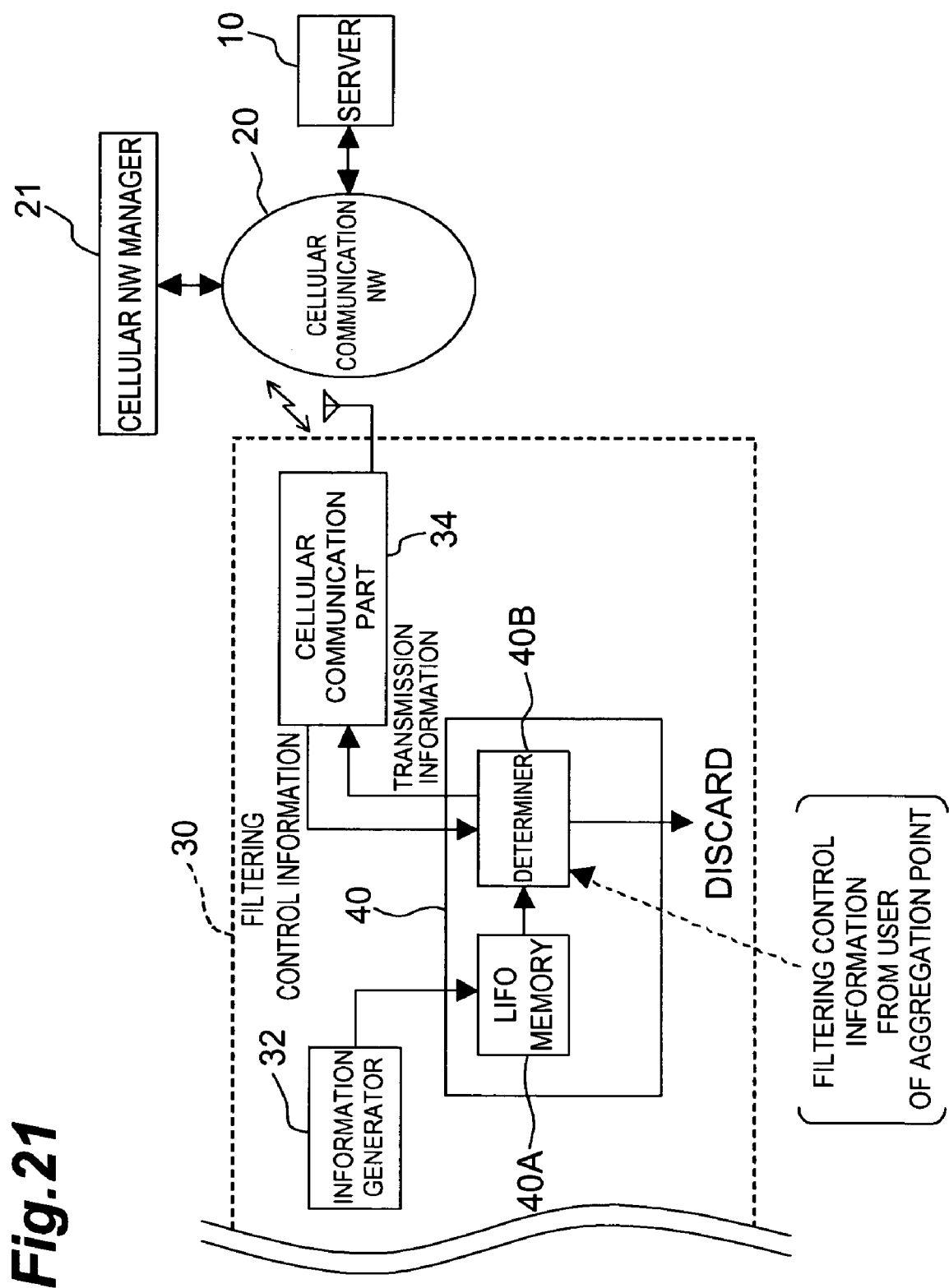
FIG. 21 is a functional block diagram of an information storage part and associated components in the seventh embodiment.

Next, the seventh embodiment will illustrate an embodiment in which the information storage part 40 described in the fifth embodiment is configured to perform filtering of transmission information to be transmitted. As shown in FIG. 21, information storage part 40 is provided with last-in first-out type memory (LIFO memory) 40A, and determining part 40B which performs the filtering of transmission information on the basis of after-described filtering control information. Namely, the LIFO memory 40A has the property of outputting data from last-memorized information in first.

An example of the filtering control information is information to designate a filtering control mode out of a variety of control modes such as a first control mode of transmitting only transmission information indicating the last state in the LIFO memory 40A as to an identical RFID ID, a second control mode of transmitting only transmission information remaining after a thinning operation according to a predetermined rule from the transmission information in the LIFO memory 40A as to an identical RFID ID, a third control mode of selecting and transmitting only transmission information of a specific RFID ID, and a fourth control mode of transmitting transmission information remaining after a thinning operation of thinning only transmission information of a specific RFID ID.

The filtering control information as described above may be generated at cellular network management part 21 and sent to aggregation point 30. In this case, as in the fourth embodiment, cellular network management part 21 may set the filtering control information, based on the three information items of the class information, the state information of cellular communication network 20, and the user request information entered into the cellular network management part 21.

The predominant part for setting the filtering control information may be the cellular network management part 21 (network management software or network administrator) as described above, or the administrator of server 10. It may also be the user of aggregation point 30 and in this case, for example, it is also possible to adopt a configuration wherein one aggregation point sets the filtering control information for another aggregation point (i.e., an aggregation point of another user).

Figure 22:
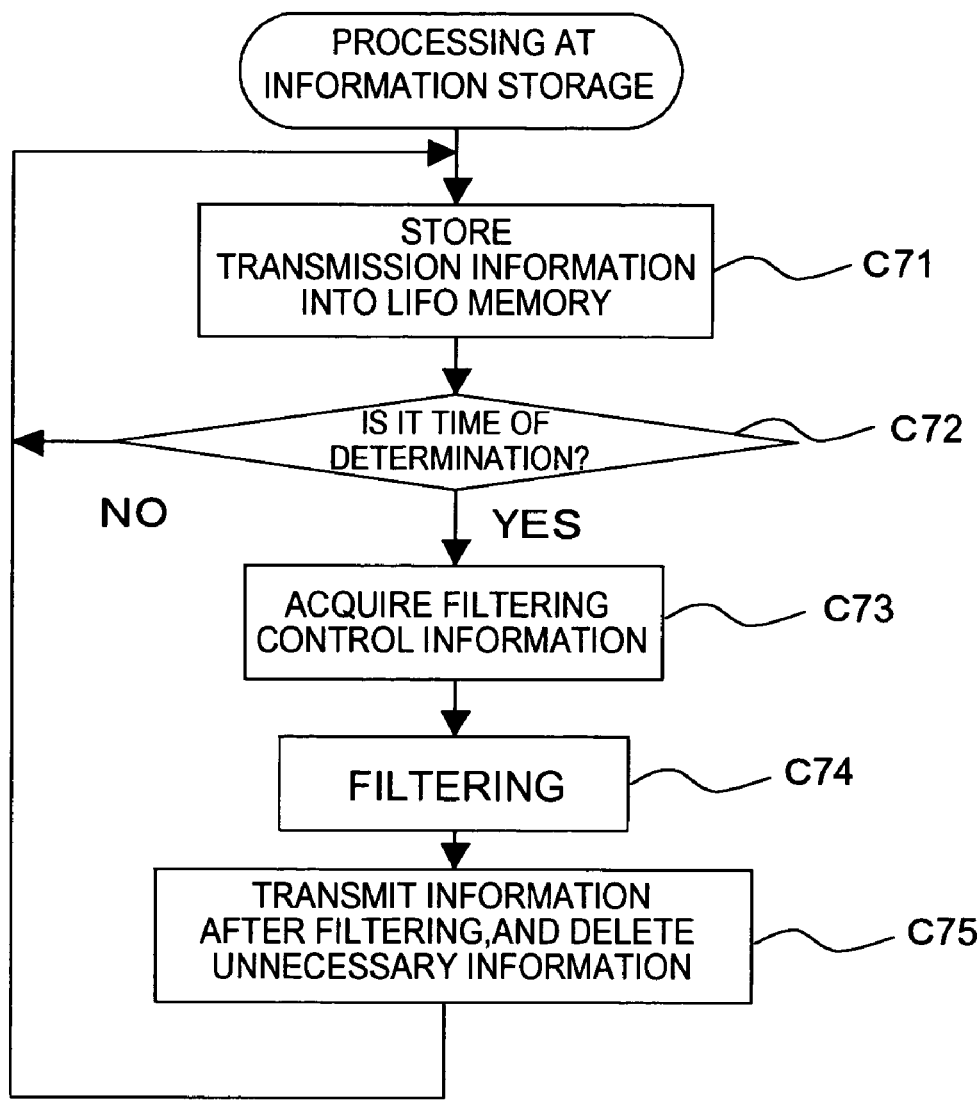
FIG. 22 is a flowchart showing processing at the information storage part in the seventh embodiment.

Here we shall explain the processing at information storage part 40 with reference to FIG. 22. Information storage part 40 first accumulates the transmission information outputted from information generating part 32, into LIFO memory 40A (C71). Thereafter, it checks whether determination timing of a predetermined period has arrived (C72) and, before arrival of the determination timing, the accumulation process of transmission information at C71 is repeatedly carried out.

Upon arrival of the determination timing, the determination part 40B acquires the filtering control information (e.g., information received from cellular network management part 21, information entered by the user of aggregation point 30, preceding information temporarily stored in the determination part 40B, etc.) (C73), and filters the transmission information to be transmitted, according to the filtering control information (C74). For example, supposing the filtering control information is "to transmit only transmission information indicating the last state in the LIFO memory 40A as to an identical RFID ID" and "to reject transmission of transmission information with an RFID ID of <A0001> only," the filtering control is carried out so as to thin out the transmission information with the RFID ID of <A0001> and, as to the other RFID IDs, thin out all the transmission information except for the transmission information of the last state in order to transmit only the transmission information indicating the last state. Then the transmission information remaining after the filtering is transmitted via cellular communication part 34 and the thinned-out transmission information is deleted (C75). Thereafter, the above processes of C71-C75 are repeated.

By the filtering function as described above, it is feasible to avoid transmission of unnecessary transmission information indicating a halfway state in the LIFO memory and thereby reduce the load of transmission processing and decrease the network traffic. By the filtering based on the designation of RFID ID, it is feasible to readily execute the transmission of only the transmission information of a specific RFID ID and the avoidance of transmission of only the transmission information of a specific RFID ID.

Eighth Embodiment

Next, the eighth embodiment will illustrate an embodiment in which the aggregation points and server are provided with the time stamp function.

The third embodiment described previously illustrated the embodiment in which time stamp generating part 54 for generating the time stamp indicating the time of transmission of ID information was provided in RFID 50 as shown in FIG. 11, but the time stamp is not limited to the time of transmission of ID information from RFID 50 and may be a time of reception of ID information at aggregation point 30 or a time of reception of ID information at server 10.

In conjunction therewith, the "update time" at the RFID location database 41 managed by server 10 shown in FIG. 4, may be any record selected from the time of transmission of ID information from RFID 50, the time of reception of ID information at aggregation point 30, and the time of reception of ID information at server 10.

Figure 23:
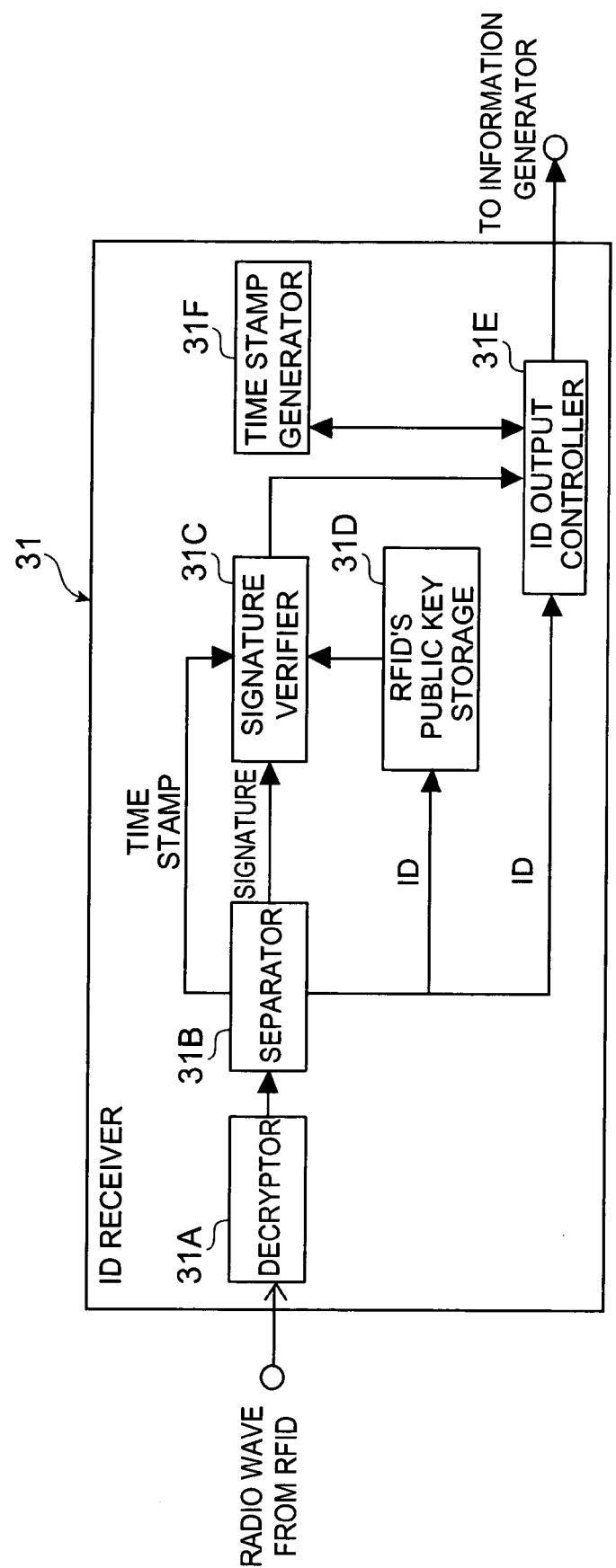
FIG. 23 is a functional block diagram of the ID receiving part in the first part of the eighth embodiment.

For adopting the reception time of ID information at aggregation point 30 as a time stamp, the ID receiving part 31 in aggregation point 30 can be constructed as shown in FIG. 23. Namely, the ID receiving part 31 maybe configured so that time stamp generating part 31F for generating the time stamp indicating the reception time of ID information is provided in ID receiving part 31, ID output control part 31E requests time stamp generating part 31F to send the time stamp at that point on the occasion of outputting the transmission information, and the time stamp acquired is attached to the transmission information to be outputted.

Figure 24:
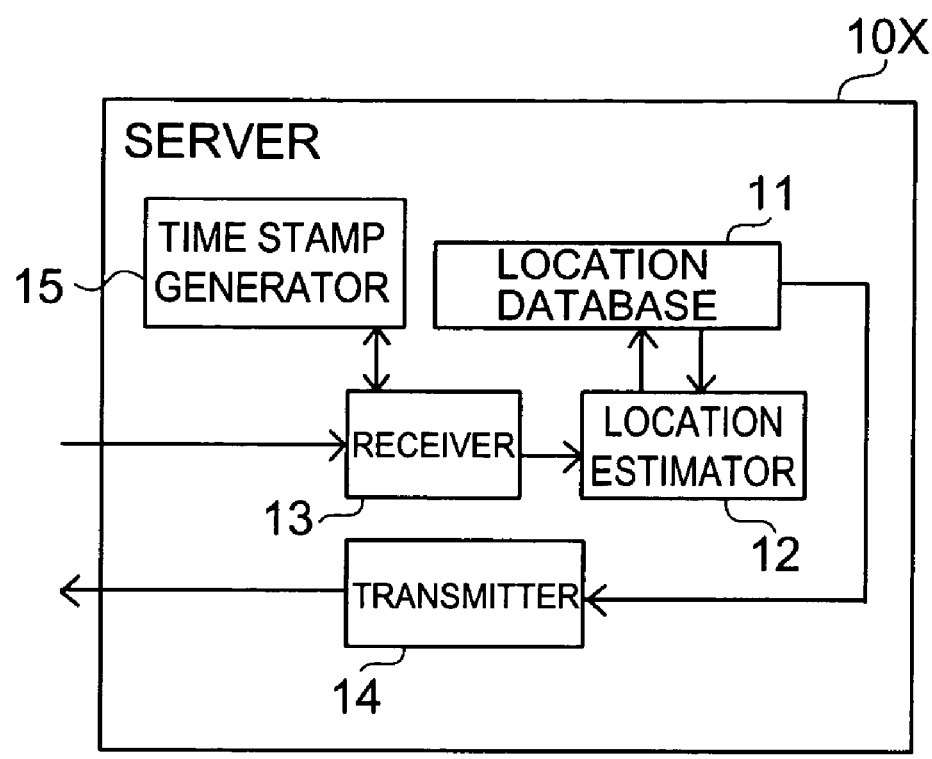
FIG. 24 is a functional block diagram of the server in the first part of the eighth embodiment.

For adopting the reception time of ID information at the server as a time stamp, it is possible to employ a configuration wherein, as shown in FIG. 24, time stamp generating part 15 for generating the time stamp indicating the reception time of ID information is provided in server 10X, receiving part 13 requests time stamp generating part 15 to send the time stamp at that point, immediately after the reception of the transmission information, and the time stamp acquired is attached to the transmission information to be outputted to the location estimating part 12.

Two or more of the transmission time of ID information from RFID 50, the reception time of ID information at aggregation point 30, and the reception time of ID information at server 10 may be recorded as a time stamp of the "update time" at the RFID location database 41 managed by server 10 shown in FIG. 4.

Incidentally, the time stamp does not have to be limited to absolute time information, but can be information about a difference (relative time) between a certain reference time and an absolute time measured. It is also possible to carry out an arithmetic operation of time such as rounding, raising, omission, and so on.

The following will illustrate a mode wherein the server transmits the reference time information to the aggregation point and the aggregation point calculates the difference between the reference time and the absolute time measured and outputs it.

Figure 25A:
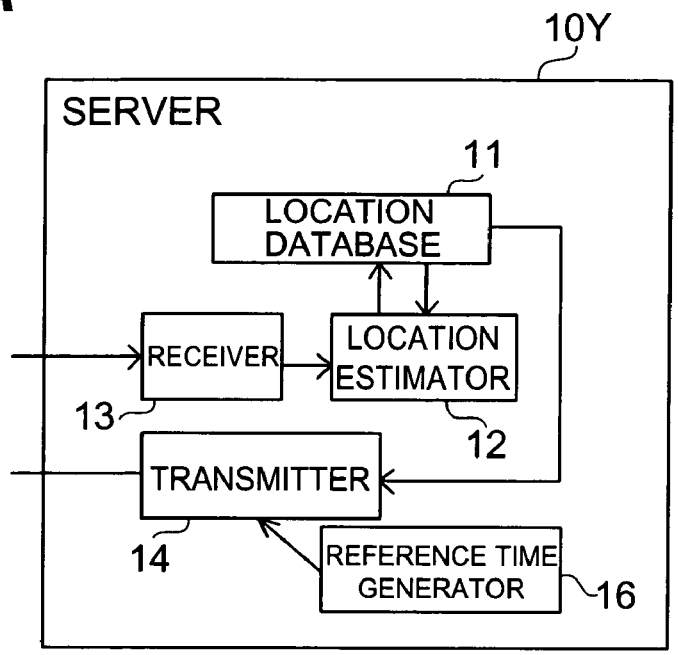
FIG. 25A is a functional block diagram of the server in the second part of the eighth embodiment.
Figure 25B:
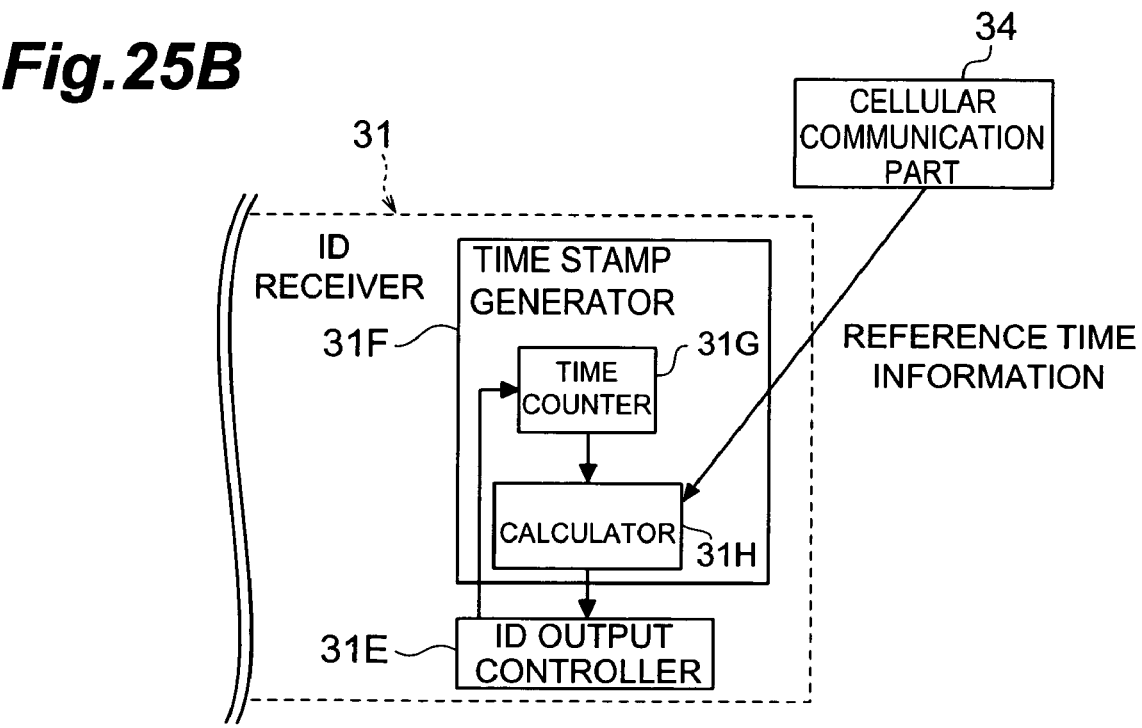
FIG. 25B is a functional block diagram of main part of the ID receiving part in the second part of the eighth embodiment.

As shown in FIG. 25A, server 10Y is provided with reference time generating part 16 for generating the reference time. As shown in FIG. 25B, ID receiving part 31 of aggregation point 30 is provided with time stamp generating part 31F having time measuring part 31G for measuring time, and calculating part 31H which calculates the difference between the reference time and the measured absolute time and outputs it.

Figure 26:
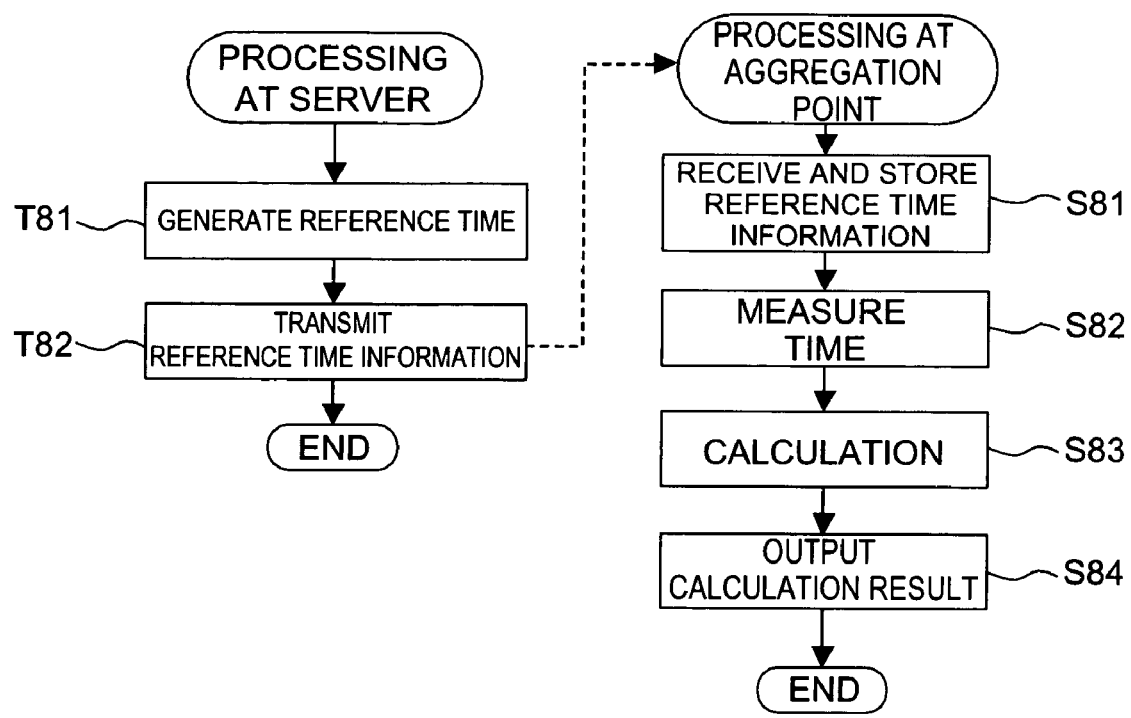
FIG. 26 is a flowchart showing processing at the server and processing at the aggregation point in the second part of the eighth embodiment.

FIG. 26 shows the contents of processing in this mode. At server 10Y, the reference time generating part 16 first generates the reference time (T81) and transmits the information of the generated reference time to aggregation point 30 (T82). At ID receiving part 31 in aggregation point 30 on the other side, the calculating part 31H of time stamp generating part 31F receives the reference time information thus transmitted, via cellular communication part 34 and stores it (S81). Then the time measuring part 31G measures the absolute time at that point as triggered by a trigger signal from ID output control part 31E, and then outputs the absolute time to calculating part 31H (S82). The calculating part 31H then calculates the difference between the reference time and the measured absolute time (S83). At this time, the value of the difference obtained may be subjected to a calculation operation such as rounding, raising, omission, or the like. Then the calculating part 31H outputs the calculation result to ID output control part 31E (S84). Thereafter, ID output control part 31E puts the calculation result obtained (the information of the difference from the reference time) into the transmission information and outputs it. This results in storing the transmission information from ID output control part 31E through information generating part 32 into memory 33 and, thereafter, transmitting the transmission information from cellular communication part 34 via cellular communication network 20 to server 10.

According to the mode of calculating and outputting the difference between the reference time and the measured absolute time as described above, the memory capacity in the storage is smaller than that in the case where the measured absolute value is outputted as it is, and the information volume transmitted in the cellular communication network 20 can be reduced.

Figure 27:
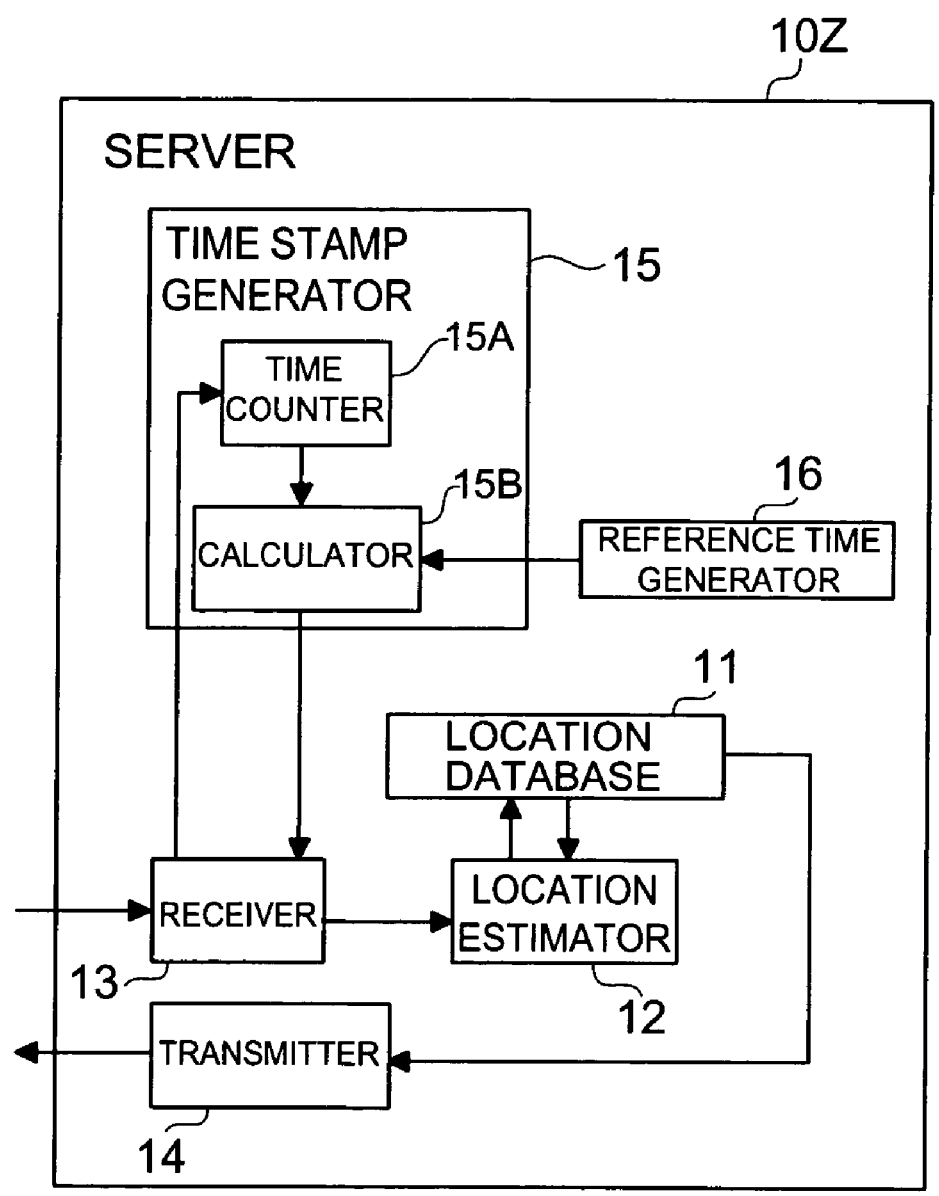
FIG. 27 is a functional block diagram showing a modification of the server in the second part of the eighth embodiment.

The time stamp generating part as shown in FIG. 25B may be provided in the server. For example, server 10Z shown in FIG. 27 is provided with time stamp generating part 15 having time measuring part 15A and calculating part 15B similar to those described above. This method of recording the time stamp generated by time stamp generating part 15 provided in the server, into the received transmission information has the advantage of eliminating the need for the process of transmitting and receiving the reference time information and the calculation result between the server and the aggregation point as in FIG. 26 described above, while also having the disadvantage of a large delay time included in the time stamp information.

On the other hand, the process of transmitting and receiving the reference time information and the calculation result between the server and the aggregation point as shown in FIG. 26 has the disadvantage of certain degree of processing load, while having the advantage of a smaller delay time included in the time stamp information.

As described above, the embodiment of FIG. 27 is in the trade-off relation with the embodiment of FIGS. 25A, 25B, and 26, but the trade-off can be adjusted by providing the server with the configurations of FIGS. 25A and 27, providing the ID receiving part of the aggregation point with the configuration of FIG. 25B, and properly switching between the above two modes according to accuracy demand of time stamp information or the like.

In the above embodiments, the invention of random access method taking intermittent reception into account can be applied to the intermittent reception control of the cellular communication function and RFID information receiving function by control information, and the method of preliminarily determining the transmission intervals of radio waves from the RFIDs individually for the respective RFIDs and letting each RFID transmit the radio wave at the determined transmission intervals. This is implemented as follows: deterministic random access, e.g., Time hopping technology or the like, is made using numbers and random values differing among transmitting radio stations, as an autonomous control method, and a receiving radio station performs intermittent reception of signals from the transmitting radio stations during periods of time except for the deterministic data transmission periods.

As described above, the present invention enables the appropriate switching among a plurality of modes by providing the mobile communication terminal with the switching control means for receiving the switching signal for switching among the plurality of modes including the identification information receive mode and the cellular communication mode and performing the mode switching control based on the switching signal. The present invention also implements the appropriate switching among a plurality of modes by letting the mobile communication terminal perform the switching control step of receiving the switching signal for switching among the plurality of modes including the identification information receive mode and the cellular communication mode and carrying out the mode switching control based on the switching signal.

What is claimed is:

1. A mobile communication terminal comprising:
   means for receiving identification information from at least one mini-communicator which transmits predetermined identification information of its own;
   means for communicating with a server or another terminal via a cellular communication network; and
   means for receiving from the server a switching signal including control information configured to control switching among a plurality of modes comprising an identification information receive mode activating only the means for receiving identification information, and a cellular communication mode activating only the means for communicating, and for performing a mode switching control based on the received switching signal.

2. The mobile communication terminal according to claim 1, further comprising:
   means for measuring a reception intensity of a radio wave received from the mini-communicator; and
   means for generating transmission information to the server, which contains the identification information of the mini-communicator received from the mini-communicator, identification information of the mobile communication terminal, and the reception intensity of the radio wave from the mini-communicator, and for making the means for communicating transmit the generated transmission information to the server.

3. The mobile communication terminal according to claim 2, further comprising:
   means for acquiring traffic information in the cellular communication network; and
   means for receiving and temporarily storing the transmission information from the means for generating, and for performing such an operation control as to output the transmission information to the means for communicating or store the transmission information, based on the traffic information in the cellular communication network acquired by the means for acquiring.

4. The mobile communication terminal according to claim 2, further comprising:
   a means for receiving and temporarily storing the transmission information from the means for generating; and
   means for selecting transmission information to be outputted, from the transmission information stored in the means for receiving and temporarily storing, based on condition information containing at least a thinning condition for transmission information or a selection condition for transmission information to be outputted or to avoid output, and for outputting the transmission information to be outputted, to the means for communicating.

5. The mobile communication terminal according to claim 2, wherein the means for generating comprises:
   means for memorizing an identification number of a mini-communicator which the mobile communication terminal was able to receive at a past point of time;
   means for comparing identification information of a mini-communicator which the mobile communication terminal is able to receive at the present time, with the identification number of the mini-communicator memorized, thereby determining whether there is a difference; and
   means for making the means for communicating transmit the transmission information to the server, in a predetermined case where it is determined at least once that there is a difference.

6. The mobile communication terminal according to claim 1, further comprising:
   means for measuring a reception intensity of a radio wave received from the mini-communicator;
   means for receiving from another mobile communication terminal, other terminal information containing the identification information of the mini-communicator, the reception intensity of the radio wave from the mini-communicator, and location information of the other mobile communication terminal; and
   means for estimating the location of the mini-communicator corresponding to the transmission information, based on the reception intensity of the radio wave from the mini-communicator, measured by the means for measuring of the mobile communication terminal, and on the other terminal information, and for notifying the server of the estimated location information.

7. The mobile communication terminal according to claim 1, further comprising means for amplifying a transmitted or received radio wave of the cellular communication network communicable with the mobile communication terminal, to relay the radio wave.

8. The mobile communication terminal according to claim 1, wherein the means for communicating is configured to:
   set a transmission/reception channel for transmission/reception of the transmission information, separately from a user channel for transmission/reception of user data and a control channel for transmission/reception of a control signal, in communication via the cellular communication network, and transmit the transmission information through the use of the transmission/reception channel.

9. A server capable of communication with at least one mobile communication terminal having means for receiving identification information from at least one mini-communicator, and means for communicating with a server or another terminal via a cellular communication network, the server comprising:
   means for transmitting to the mobile communication terminal a switching signal according to a predetermined mode switching request, in order to implement switching among a plurality of modes comprising an identification information receive mode activating only the means for receiving identification information, and a cellular communication mode activating only the means for communicating, at the mobile communication terminal;
   a mini-communicator location database configured to store location information of at least one mini-communicator;
   a terminal location database configured to store location information of at least one mobile communication terminal; and
   means for estimating a location of a mini-communicator corresponding to transmission information, based on transmission information from said mobile communication terminal containing identification information of a mini-communicator which a mobile communication terminal received from said mini-communicator, identification information of said mobile communication terminal, and a reception intensity of a radio wave from said mini-communicator, the pre-stored location information of the mini-communicator, and the pre-stored location information of the mobile communication terminal, and for updating the mini-communicator location database by the estimated location information.

10. The server according to claim 9, further comprising:
a mini-communicator location database configured to store location information of at least one mini-communicator; and
means for receiving location information of a mini-communicator estimated and notified of by a mobile communication terminal, and for updating the mini-communicator location database by the received location information.

11. A communication system comprising at least one mini-communicator configured to transmit predetermined identification information of its own; a server capable of being connected to a cellular communication network; and at least one mobile communication terminal functioning as an aggregation point for aggregating information from the mini-communicator;
wherein the mobile communication terminal comprises:
means for receiving the identification information from the mini-communicator;
means for communicating with the server or another terminal via the cellular communication network; and
means for receiving from the server a switching signal including control information configured to control switching among a plurality of modes comprising an identification information receive mode activating only the means for receiving identification information, and a cellular communication mode activating only the means for communicating, and for performing a mode switching control based on the received switching signal;
wherein the server comprises:
means for transmitting a switching signal according to a predetermined mode switching request to the mobile communication terminal; and
wherein the means for receiving a switching signal of the mobile communication terminal performs the mode switching control based on the switching signal received from the server.

12. The communication system according to claim 11, said communication system further comprising a cellular network management apparatus including:
means for monitoring a state of the cellular communication network;
means for memorizing class information defined for each mobile communication terminal or for each user of the mobile communication terminal;
means for accepting a user request about the mode switching control; and
means for generating a mode switching signal based on at least one of the class information acquired from the means for memorizing, the state information of the cellular communication network acquired in monitoring by the means for monitoring, and the user request accepted by the means for accepting, and for transmitting the switching signal to the mobile communication terminal;
wherein the means for receiving a switching signal of the mobile communication terminal performs the mode switching control based on the switching signal received from the cellular network management apparatus.

13. The communication system according to claim 11, wherein the server further comprises:
means for generating a reference time as a reference of time stamp and transmitting the reference time to the mobile communication terminal, and
wherein the mobile communication terminal further comprises:
means for measuring time; and
means for calculating a difference between the reference time transmitted from the server, and a measured time, and for outputting the value of calculated difference as a time stamp.

14. The communication system according to claim 11, wherein at least one of the mobile communication terminal and the server further comprises means for authenticating whether a mini-communicator is a qualified one.

15. A communication control method in a communication system comprising at least one mini-communicator configured to transmit predetermined identification information of its own, a server capable of being connected to a cellular communication network, and at least one mobile communication terminal functioning as an aggregation point for aggregating information from the mini-communicator, the communication control method comprising:
receiving at a mobile communication terminal from the server a switching signal including control information configured to control switching among a plurality of modes comprising an identification information receive mode activating only means for receiving the identification information from the mini-communicator and a cellular communication mode activating only a means for communicating, at the mobile communication terminal; and
performing a mode switching control based on the received switching signal.

16. The communication control method according to claim 15, further comprising:
measuring a reception intensity of a radio wave received from the mini-communicator, at the mobile communication terminal;
generating transmission information to the server, which contains the identification information of the mini-communicator received from the mini-communicator, identification information of the mobile communication terminal, and the reception intensity of the radio wave from the mini-communicator, at the mobile communication terminal;
transmitting the generated transmission information to the server, at the mobile communication terminal; and
estimating a location of a mini-communicator corresponding to the transmission information, based on the received transmission information, pre-stored location information of the mini-communicator, and pre-stored location information of the mobile communication terminal, at the server.

17. The communication control method according to claim 16, wherein the generating includes:
comparing an identification number of a mini-communicator which the mobile communication terminal was able to receive at a past point of time, with identification information of a mini-communicator which the mobile communication terminal is able to receive at the present time, to determine whether there is a difference; and producing the transmission information, in a predetermined case where it is determined at least once that there is a difference.

18. The communication control method according to claim 15, further comprising:
    measuring a reception intensity of a radio wave received from the mini-communicator, at the mobile communication terminal;
    receiving from another mobile communication terminal, other terminal information containing identification information of a mini-communicator, a reception intensity of a radio wave from said mini-communicator, and location information of the other mobile communication terminal, at the mobile communication terminal; and
    estimating a location of the mini-communicator corresponding to transmission information, based on the reception intensity of the radio wave from the mini-communicator, which was measured at the mobile communication terminal, and on the other terminal information, at the mobile communication terminal.

19. A recording medium including communication control program instructions to be executed by a computer in a mobile communication terminal comprising means for receiving identification information from at least one mini-communicator configured to transmit predetermined identification information of its own, and means for communicating with a server or another terminal via a cellular communication network, the communication control program causes the computer to execute a method comprising:
    receiving from the server a switching signal including control information configured to control switching among a plurality of modes comprising an identification information receive mode activating only the means for receiving identification information, and a cellular communication mode activating only the means for communicating; and
    performing a mode switching control based on the received switching signal.

* * * * *